United States Patent [19]
Phillips et al.

[11] Patent Number: 5,857,100
[45] Date of Patent: Jan. 5, 1999

[54] SYSTEM, METHOD AND ARTICLE OF MANUFACTURE FOR EXTENDING EXTERNALIZATION FOR UNIVERSAL TRANSACTION PROCESSING

[75] Inventors: Mark Phillips, Campbell; Michael Blevins, Felton, both of Calif.

[73] Assignee: Insession Inc., Campbell, Calif.

[21] Appl. No.: 707,190

[22] Filed: Sep. 3, 1996

[51] Int. Cl.[6] .................................................... G06F 9/00
[52] U.S. Cl. ........................................... 395/671; 395/684
[58] Field of Search .................................... 395/671, 650, 395/670, 701, 711

[56] References Cited

U.S. PATENT DOCUMENTS

| | | | |
|---|---|---|---|
| 5,265,250 | 11/1993 | Andrade et al. | 395/671 |
| 5,404,523 | 4/1995 | DellaFera et al. | 395/671 |
| 5,428,782 | 6/1995 | White | 395/671 |

*Primary Examiner*—Majid A. Banankhah
*Attorney, Agent, or Firm*—Sanford E. Warren, Jr.

[57] ABSTRACT

A computer implemented transaction processing system is presented for processing transactions between an application and one or more transaction processors. The system utilizes a first communication link between the application and a transaction processor interoperability component. Then, the system determines which of the one or more transaction processors will process transactions for the application and establishes a communication link between the transaction processor interoperability component and the transaction processor that will process transactions for the application. Then, as the application transmits a transaction from the application to the transaction processor interoperability component, the transaction is formatted by the transaction processor interoperability component for compatability with the transaction processor that will process transactions for the application, and finally transmitting the formatted transaction to the transaction processor that will process transactions for the application. Externalization processing has been extended to provide direct support for communicating to transaction processors.

21 Claims, 26 Drawing Sheets

SYSTEM, METHOD AND ARTICLE OF MANUFACTURE FOR EXTENDING EXTERNALIZATION FOR UNIVERSAL TRANSACTION PROCESSING

FIELD OF THE INVENTION

The present invention relates to transaction processing in a heterogeneous transaction processing system, and more specifically, to a system, method and article of manufacture for providing interoperability between different transaction processing systems.

BACKGROUND OF THE INVENTION

A significant number of customers and vendors are either rewriting their current transaction-oriented business applications, or writing new ones, using object-oriented methodology and languages. This reengineering has caused many of them to look not only at object-orientation, but also at distributed object-computing infrastructure, (such as Object Request Brokers (ORB)s and related services), for deploying applications. Using an ORB provides an "open" (platform-and vendor-independent) style of application.

Object oriented programming (OOP) has become increasingly used to develop complex applications. As OOP moves toward the mainstream of software design and development, various software solutions require adaptation to make use of the benefits of OOP. A need exists for these principles of OOP to be applied to a universal transaction interface for a plurality of heterogeneous transaction processing systems such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

Object-Oriented Programming (OOP) allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

- Objects can represent physical objects, such as automobiles in a traffic-flow simulation, electrical components in a circuit-design program, countries in an economics model, or aircraft in an air-traffic-control system.
- Objects can represent elements of the computer-user environment such as windows, menus or graphics objects.
- An object can represent an inventory, such as a personnel file or a table of the latitudes and longitudes of cities.
- An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch.

Since 90% already came from an inventory of extensively tested reusable objects, the potential domain from which an error could originate is 10% of the program. As a result, OOP enables software developers to build objects out of other, previously built, objects. This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

- Objects and their corresponding classes break down complex programming problems into many smaller, simpler problems.
- Encapsulation enforces data abstraction through the organization of data into small, independent objects that can communicate with each other. Encapsulation protects the data in an object from accidental damage, but allows other objects to interact with that data by calling the object's member functions and structures.
- Subclassing and inheritance make it possible to extend and modify objects through deriving new kinds of objects from the standard classes available in the system. Thus, new capabilities are created without having to start from scratch.
- Polymorphism and multiple inheritance make it possible for different programmers to mix and match characteristics of many different classes and create specialized objects that can still work with related objects in predictable ways.
- Class hierarchies and containment hierarchies provide a flexible mechanism for modeling real-world objects and the relationships among them.
- Libraries of reusable classes are useful in many situations, but they also have some limitations. For example:
  - Complexity. In a complex system, the class hierarchies for related classes can become extremely confusing, with many dozens or even hundreds of classes.
  - Flow of control. A program written with the aid of class libraries is still responsible for the flow of control (i.e., it must control the interactions among all the objects created from a particular library). The programmer has to decide which functions to call at what times for which kinds of objects.
  - Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes an object-oriented paradigm that is seen by customers and vendors to provide significantly cheaper application development, in terms of resources required and re-usability of functions and code. However, nearly everyone who has business-and mission-critical applications currently uses a Transaction Processing (TP) monitor system. Today, the most prevalent TP monitor is the Customer Information Control System (CICS) from IBM, followed closely by Information Management System (IMS) from IBM. Other key TP monitors are Pathway from Tandem and Tuxedo from BEA systems. TP monitoring systems are of increasing importance to major banks and airlines.

In the future, the Object Management Group (OMG)-defined Common Object Request Broker Architecture (CORBA), Object Request Broker (ORB) and CORBA Object Transaction Services (OTS), and Microsoft's OLE TP/Network TP will be used to deploy distributed applications, may eventually replace today's special purpose TP monitors. CORBA (Common Object Request Broker Architecture) is a standard for distributed objects being developed by the Object Management Group (OMG). The OMG is a consortium of software vendors and end users. Many OMG member companies are then developing commercial products that support these standards and/or are developing software that use this standard. CORBA provides the mechanisms by which objects transparently make requests and receive responses, as defined by OMG's ORB. The CORBA ORB provides interoperability between applications built in (possibly) different languages, running on (possibly) different machines in heterogeneous distributed environments. It is the cornerstone of OMG's CORBA architecture.

Interoperability between existing TP monitors and new styles of distributed computing using ORBs will be key to an orderly and low-risk migration to new business applications. Thus, there is a requirement for a product that provides transaction interoperability components that run on the popular client platforms, e.g. NT, Sun, HP and DEC and inter-operate with large server systems, e.g. MVS, Tandem, SP2 and HP. These components must allow new (object-oriented) business applications to inter-operate with current TP monitors, using APIs based on a standard object model. The goal of the API design is to allow an application programmer access to services and data residing in an existing TP monitor environment, without requiring the programmer to understand the TP monitor programming model.

SUMMARY OF THE INVENTION

A computer implemented universal, user interface to a plurality of heterogeneous transaction processing systems which allows an application program to access transactions and data residing in an existing transaction processing system is disclosed. The system utilizes a communication link between the application and a transaction processor interoperability component. Then, the system determines which of the one or more transaction processors will process transactions for the application and establishes a communication link between the transaction processor interoperability component and the transaction processor that will process transactions for the application. Then, as the application transmits a transaction from the application to the transaction processor interoperability component, the transaction is formatted by the transaction processor interoperability component for compatability with the transaction processor that will process transactions for the application, and finally transmitting the formatted transaction to the transaction processor that will process transactions for the application. Externalization processing has been extended to provide direct support for communicating to transaction processors.

DESCRIPTION OF THE DRAWINGS

The foregoing and other objects, aspects and advantages are better understood from the following detailed description of a preferred embodiment of the invention with reference to the drawings, in which.

DETAILED DESCRIPTION

Figure 1:
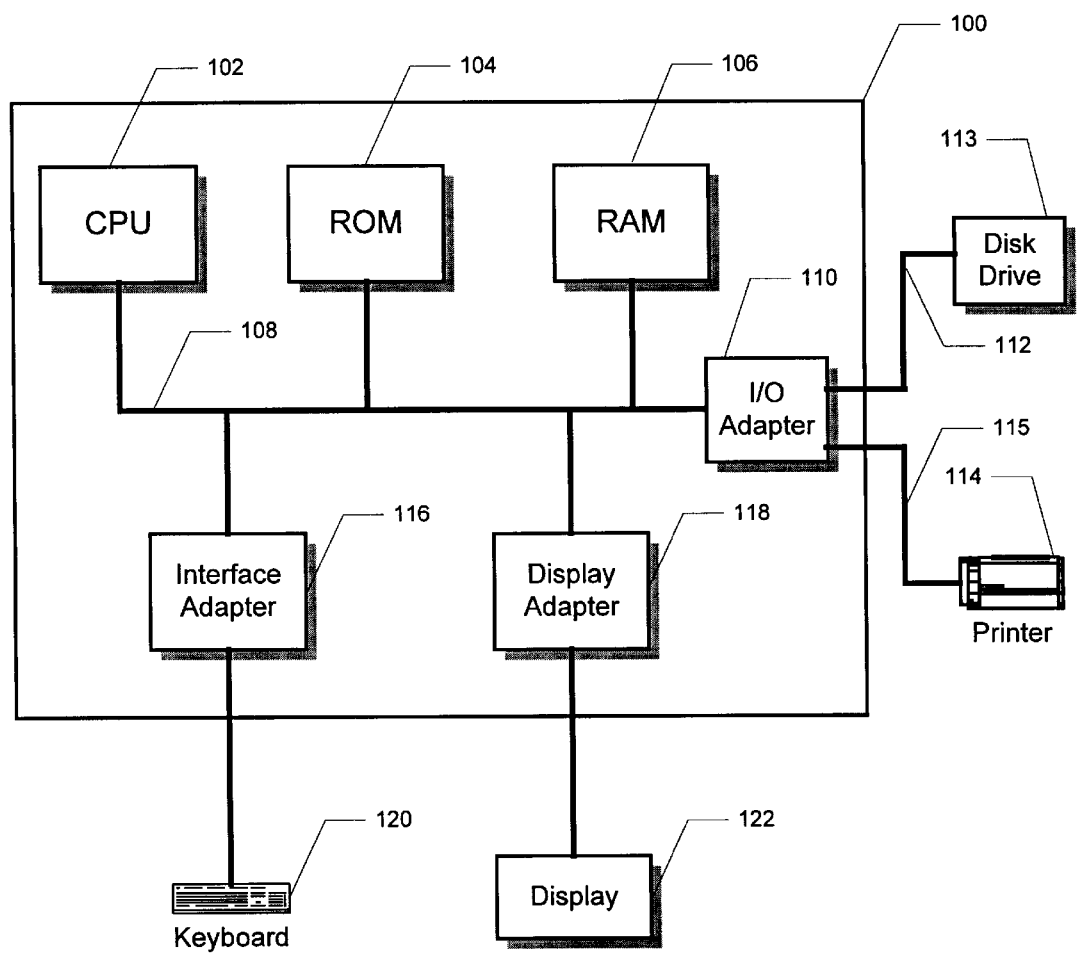
FIG. 1 illustrates a typical hardware configuration of a workstation in accordance with a preferred embodiment.

A preferred embodiment of a system in accordance with the present invention is preferably practiced in the context of a personal computer such as the IBM PS/2, Apple Macintosh computer or an UNIX based workstation. A representative hardware environment is depicted in FIG. 1, which illustrates a typical hardware configuration of a workstation in accordance with a preferred embodiment having a central processing unit 10, such as a microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

Figure 2A:
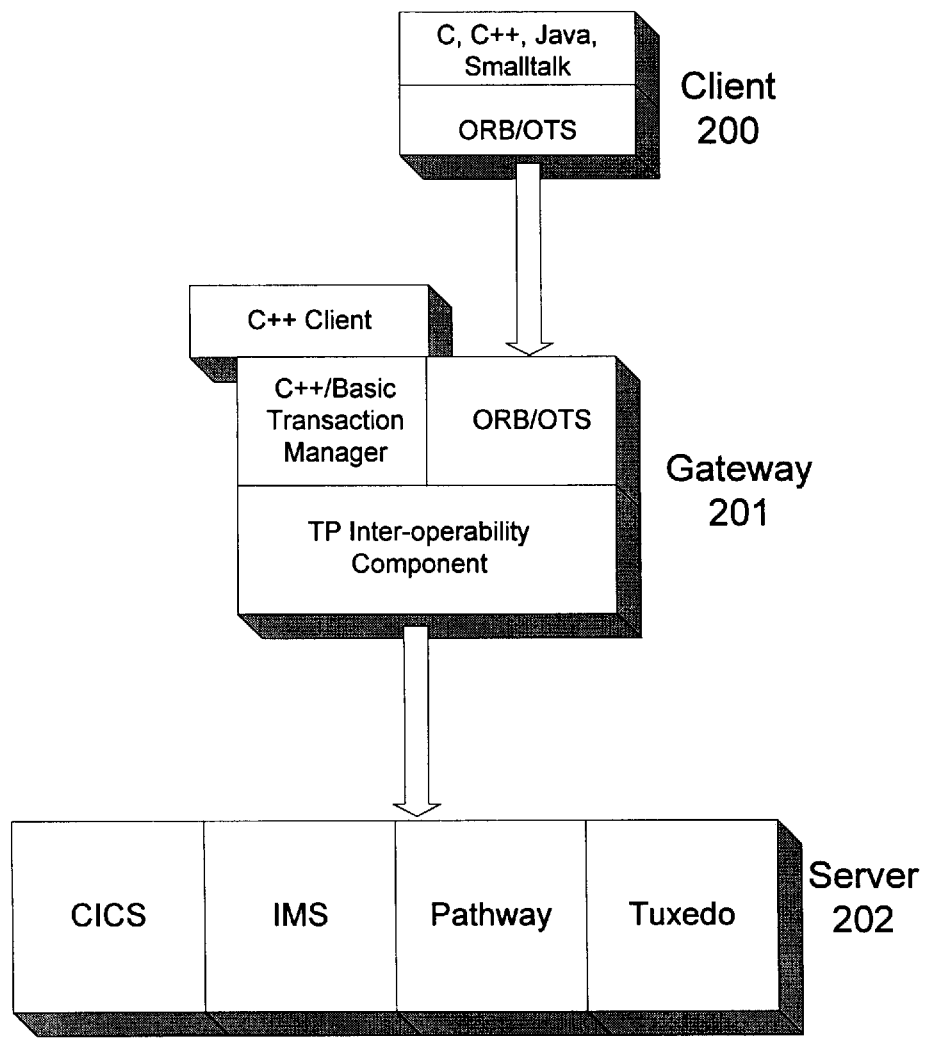
FIG. 2A illustrates the three major architectural components in accordance with a preferred embodiment.

FIG. 2A illustrates the three major architectural components in accordance with a preferred embodiment. A client 200 consists of C, C++, Java and Smalltalk applications which converse with an Object Request Broker (ORB) or an Object Transaction System (OTS) to prepare transactions to the Gateway 201. The Gateway 201 provides the interoperability functioning to interface with any of a number of TP monitors on the Server 202, such as CICS, IMS, Pathway and Tuxedo.

Figure 2B:
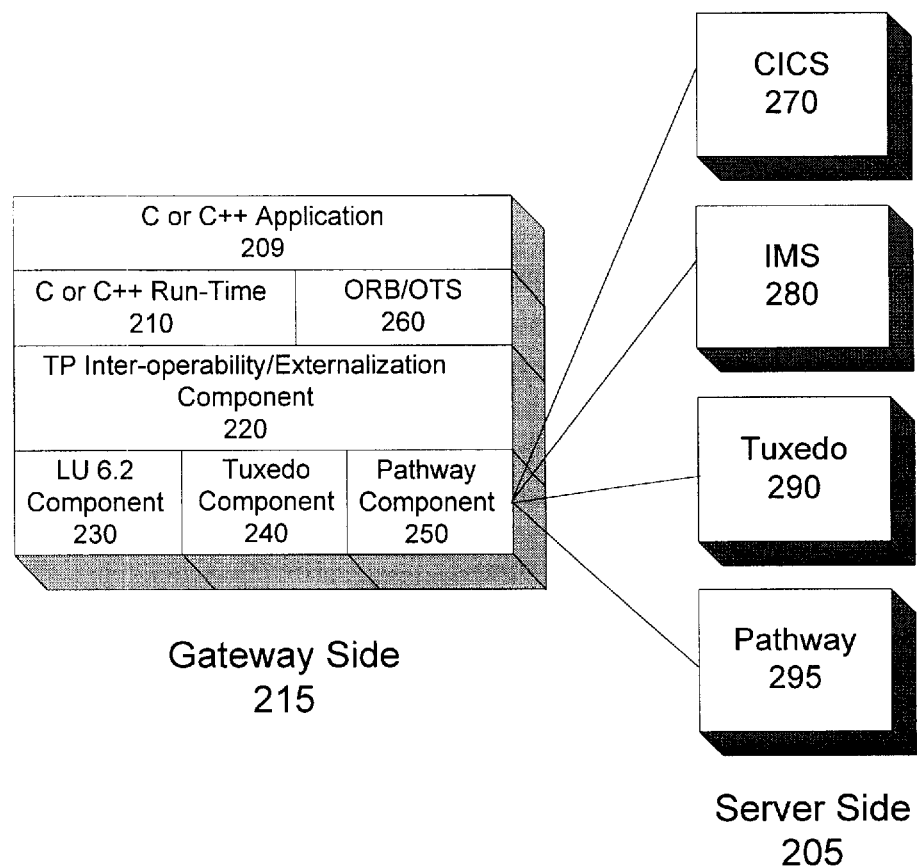
FIGS. 2B & 2C illustrate block diagram of a system architecture in accordance with a preferred embodiment.
Figure 2C:
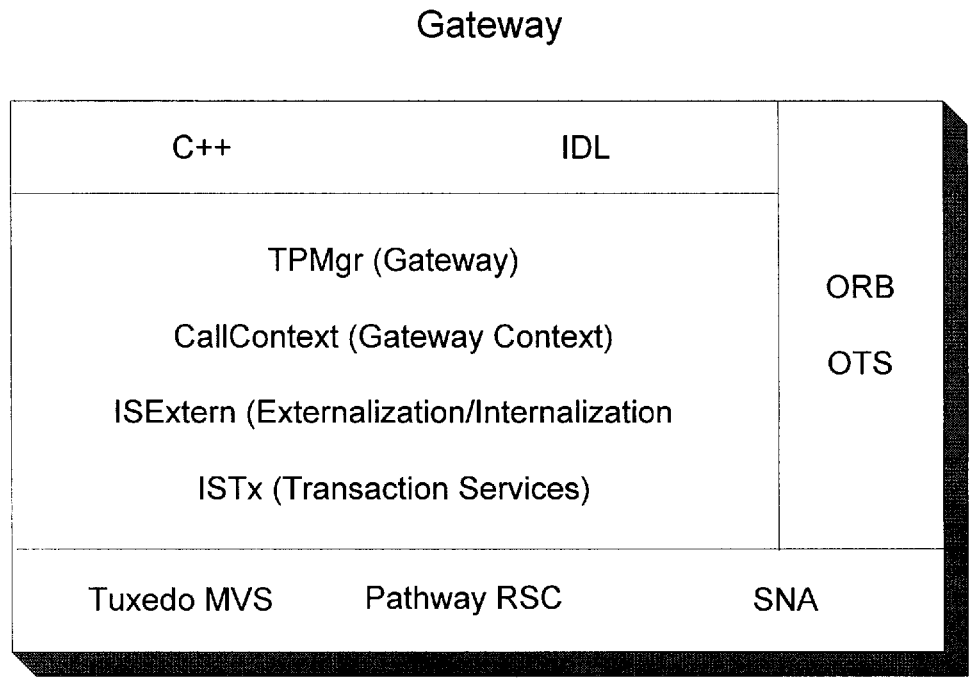

FIGS. 2B and 2C illustrate block diagrams of a system architecture in accordance with a preferred embodiment. The application programmer is provided with a single model for accessing existing TP monitor services and data. The model has a gateway side 215 and a server side 205. The server side contains each of the TP servers for CICS 270, IMS 280, Tuxedo 290 and Pathway 295.

Underlying the TP inter-operability component are three TP monitor specific components (concrete implementations of TP monitor independent interfaces) LU 6.2 230, Tuxedo 240 and the Pathway 250 component. The LU6.2 230 component is used for the CICS and IMS interaction, the Tuxedo 240 component is used to support both native and/WS interface and the Pathway 250 component is used to support the RSC interface. Applications 209 are connected via a runtime 210 or ORB 260 to a TP interoperability/externalization component 220 to the appropriate TP component (230, 240 or 250) based on application requirements.

Figure 3:
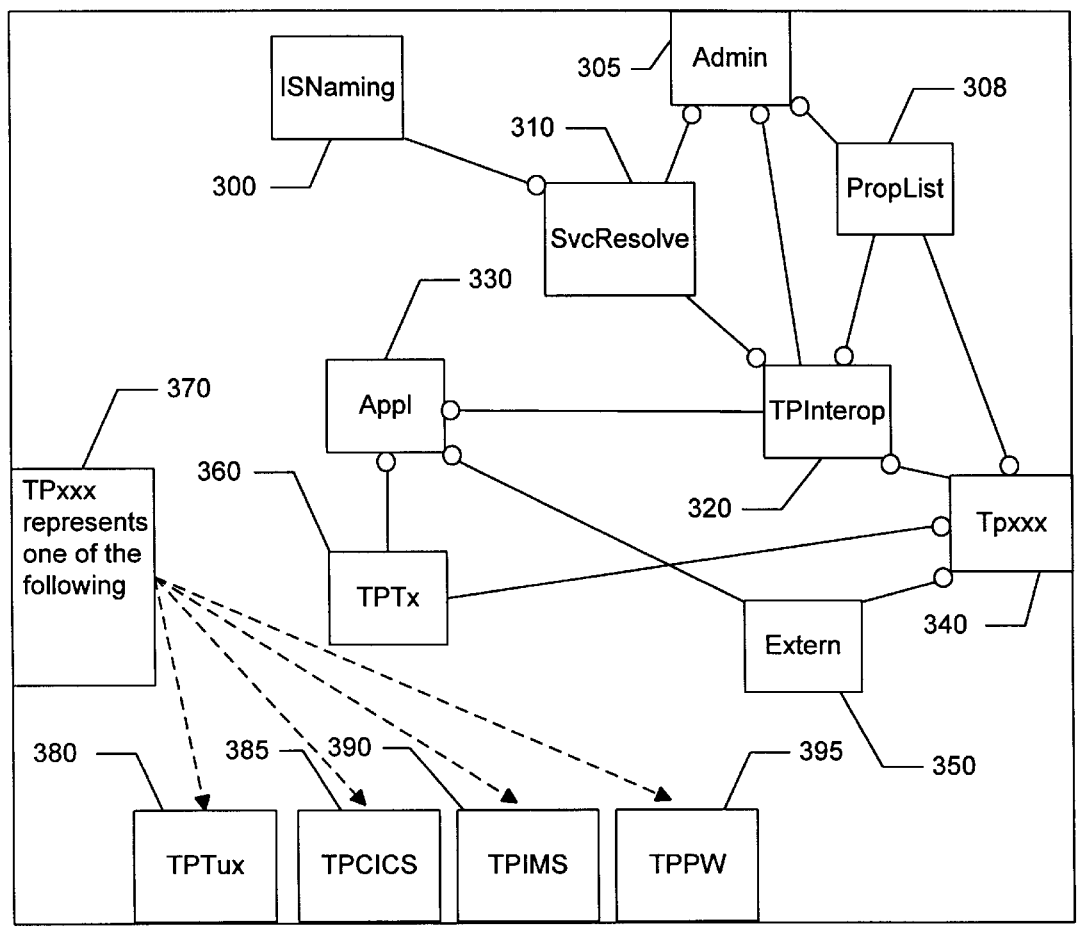
FIG. 3 is an object model system diagram in accordance with a preferred embodiment.

FIG. 3 is an object model system diagram in accordance with a preferred embodiment. Each of the individual objects are described in more detail later in the specification, so for now, an overview of their interconnection and function is provided. The OMG naming service 300 is the principal means for objects to locate other objects. The names given to the objects should be easily recognizable and readable within the problem domain of the application. The naming service will map these user-defined "names" to object references. The name-to-object association is called a "name binding". A "naming context" is an object that contains a set of "name bindings" in which each name is unique. Every object has a unique object ID or reference. One or more names can be associated with the same object reference at the same time, however there is no requirement for all objects to be named.

The admin tool 305 is used to provide an interface between a human administrator and programmatic interfaces offered by internal classes.

Processing comprises the following basic steps. First, get a name context from the user, then present the user with either an existing or default set of property values for modification, and finally store the name context and set of property values.

The property list classes 308 encapsulate property list handling for various concrete TPInterop classes. TPInterop::TPmgr 320 executes on the gateway and accepts a request along with a description of the destination from front-end clients and delegates them to a specific interoperable object 340 (370)(e.g. TPCICS::CallContext 385, TPIMS::CallContext 390, TPTux::CallContext 380 and TPPW-::CallContext 395) according to the destination. Since the whole invocation is carried out in a distributed environment, parameters are passed via Extern::Streamable objects 350.

The TPTX class category 360 supports a "mini" transaction interface, useful until OTS can be used. A TPxxx::callMgr inherits from TxRcvr to get the transaction commit signals, and registers itself with the TxXMgr 340 using its factory name as the "id". Applications 330 communicate to the various system objects via transactions.

Scenarios

The following scenarios provide descriptions of sample interaction between major objects of the system.

Figure 4:
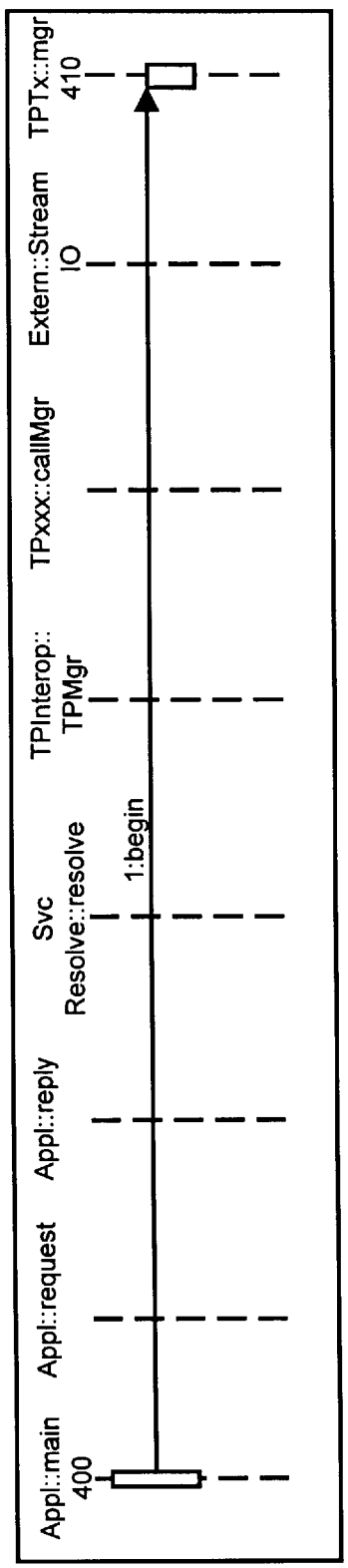
FIG. 4 is an illustration of a diagram for an application starting a transaction in accordance with a preferred embodiment.

FIG. 4 is an illustration of a diagram for an application starting a transaction in accordance with a preferred embodiment. When an application 400 starts a transaction, an application request 410 is transmitted to the TP manager 410.

Figure 5:
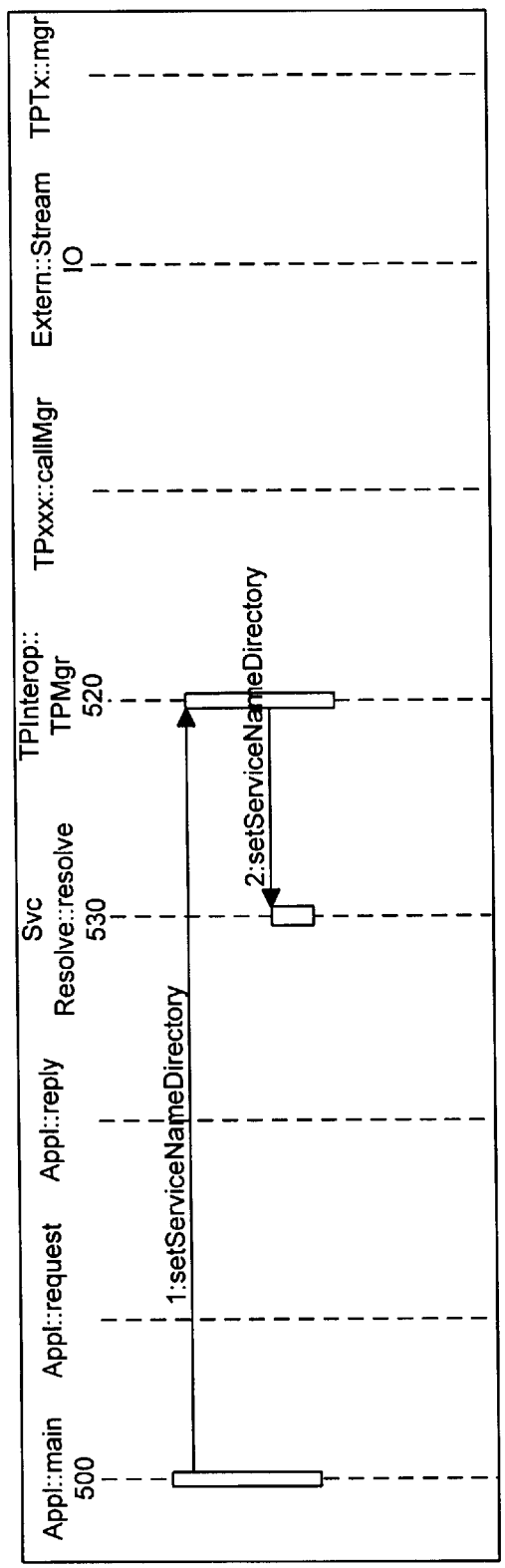
FIG. 5 is an illustration of an application setting a default context in accordance with a preferred embodiment.

FIG. 5 is an illustration of an application setting a default context in accordance with a preferred embodiment. Processing commences when an application 500 sends a setDefaultContext transaction to the TPInterop TP Manager 520 which results in a the default context being set by the service resolver 530.

Figure 6:
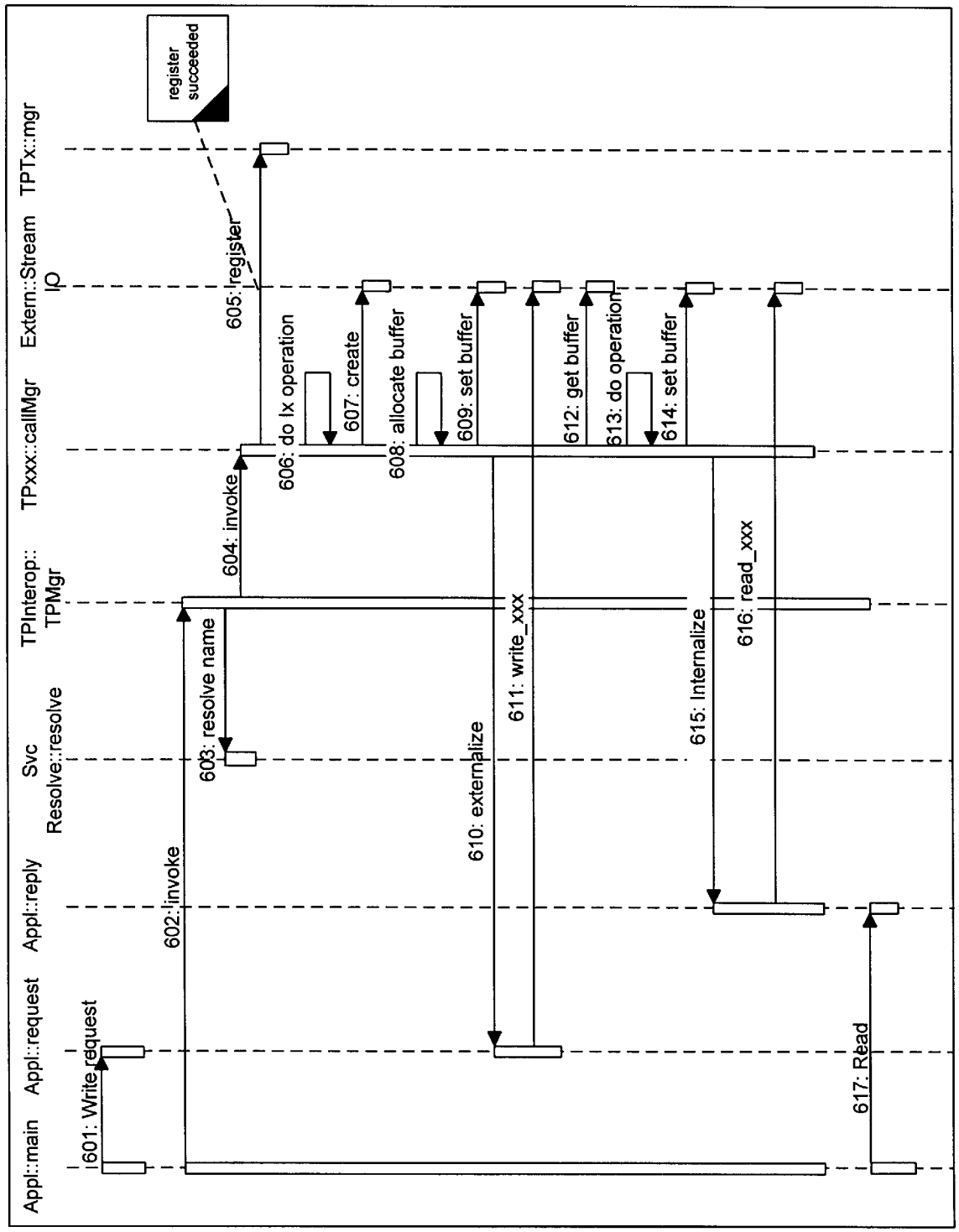
FIG. 6 is an illustration of an application invoking a service in accordance with a preferred embodiment.

FIG. 6 is an illustration of an application invoking a service in accordance with a preferred embodiment. Processing commences when an application 601 transmits a write request to a TP. The request generates an invoke transaction 602 to the Tpinterop which results in a resolution of the name 603. The resolved name is utilized in another invoke 604 to register the name via the call manager to the TP transmit manager 605. Then the call manager transmits the registered name 606 which results in a creation operation 607 for the particular transaction. The call manager for the particular TP allocates a buffer 608 and then sets the buffer in preparation for the write operation 609.

Then, the call manager externalizes the write operation 610 in preparation for the actual write operation 611 performed by the external object stream IO processor. Next, the call manager must get the buffer 612 that the external object has streamed back from the target TP. Then, the call manager performs a do operation 613 and sets the buffer 614 in preparation for internalizing 615 the information. Finally, a read is requested from the application 616 and the information is read 617.

Figure 7:
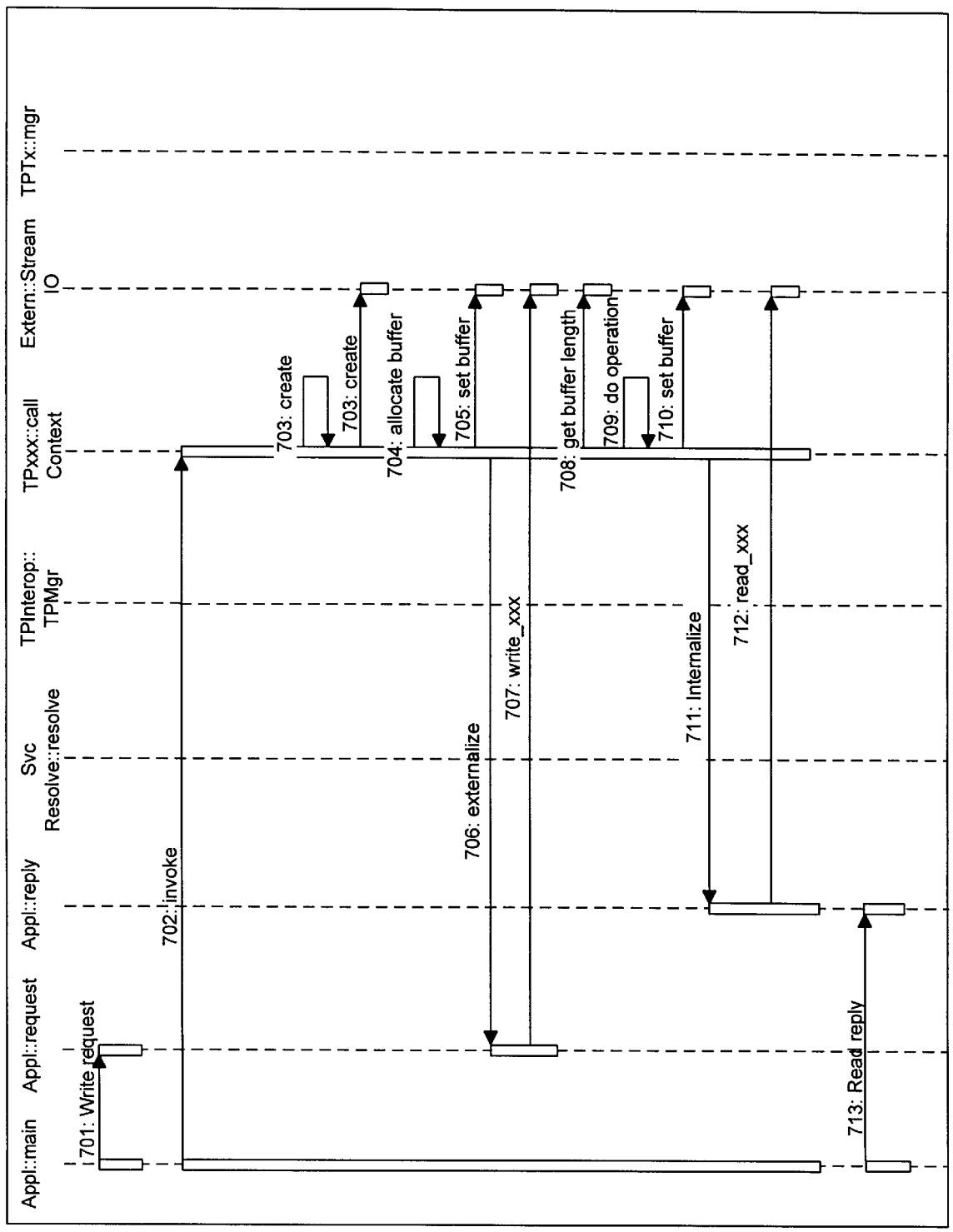
FIG. 7 is an illustration of an application continuing a service conversation with a TP in accordance with a preferred embodiment.

FIG. 7 is an illustration of an application continuing a service conversation with a TP in accordance with a preferred embodiment. In the scenario illustrated in FIG. 6, the invoke on the TPInterop::TPMgr, and the subsequent invoke on the TPxxx::callMgr, may return a CallContext object. For the purposes of this scenario, the invoke did return a CallContext object and the application is now invoking an operation on it 702. The invoke operation 702 was initiated in response to the write request 701 and initially must create an object for streaming the information externally 703. Then a buffer must be allocated 704 and the buffer must be set 705 for the upcoming externalize 706 and write 707 operations. To read the reply 713, first the buffer length must be obtained 708 and a d operation 709 must be performed to set the buffer 710 and internalize 711 the results. Then, the read 712 operation can transpire resulting in the reply being read 713.

Figure 8:
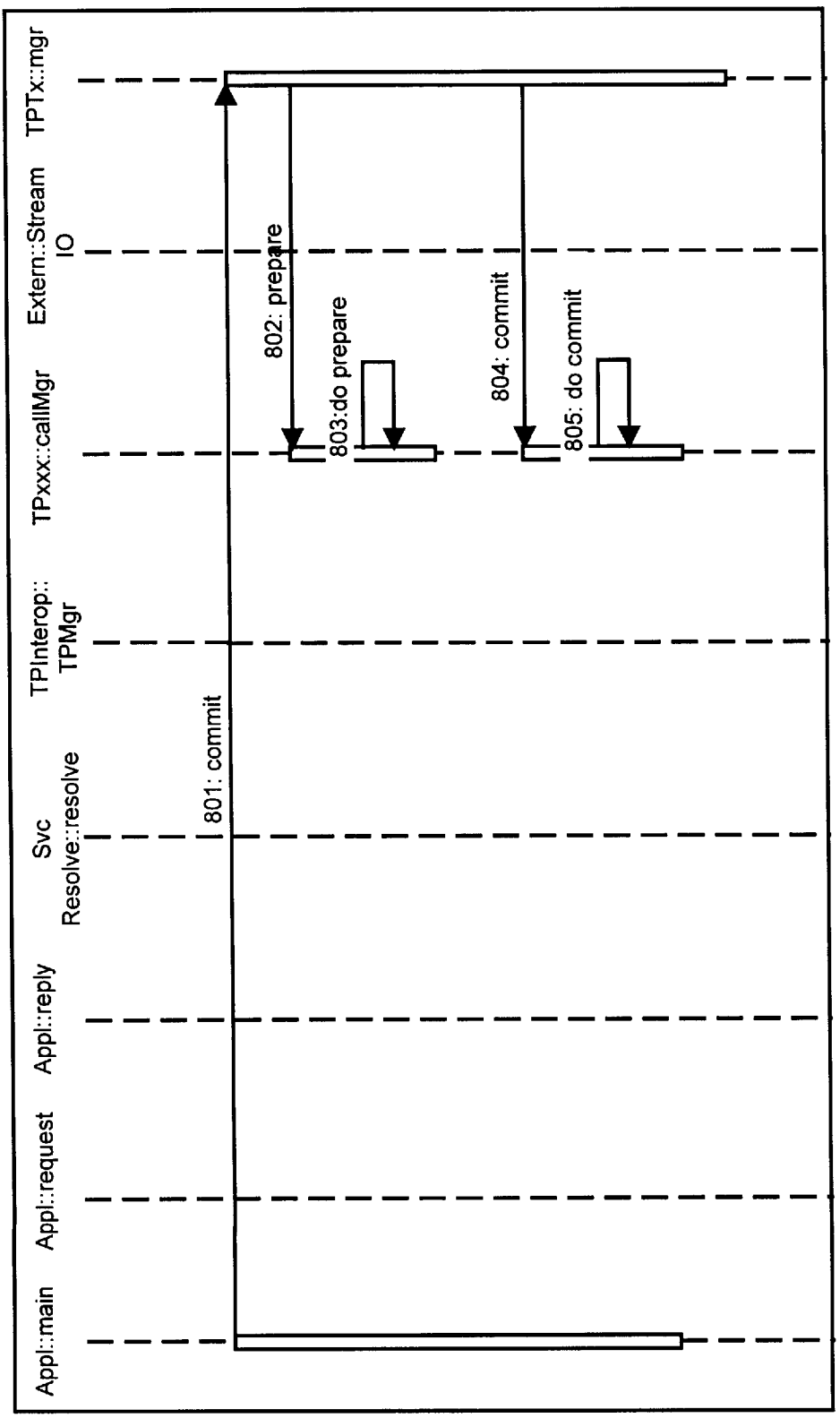
FIG. 8 illustrates an application commit on a transaction in accordance with a preferred embodiment.

FIG. 8 illustrates an application commit on a transaction in accordance with a preferred embodiment. Processing commences with a commit operation 801 from the application to the transaction manager. This action results in the TP call manager preparing 802 utilizing a prepare operation 803. Then, the TP manager commits 804 and the commit operation is performed 805.

TPTX

The TPTX class category supports a "mini" transaction interface, useful until OTS can be used. A TPxxx::callMgr inherits from TxRcvr to get the transaction commit signals, and registers itself with the TxXMgr using its factory name as the "id".

Source code for the module is provided below for detailed logic.

- 23 -

```
        -------------------------
        Public TxMgr interfaces
        -------------------------
        namespace ISTx {
        PUBLIC_NAMESPACE
           enum CompletionStatus {COMPLETED_YES, COMPLETED_NO,
        COMPLETED_MAYBE};
           //
           // Completion Status of Current operations
           //
           enum ReportHeuristics { kReportYes , kReportNo };
           //
           // Flags to pass into Current::commit. If kReportYes is specified,
           // all delegated commits will wait for the 2nd phase to complete
           // before returning.

enum MinorError {
           //
           // Minor error returned by Current operations.
           //
              SubtransactionUnavailable,
              //
              // Returned when Current::begin is called when there is
```

- 24 -

```
            // already a current transaction
            //
            NoTransaction,
            //
    5       // Returned when there is not a current transaction
            //
            HeuristicMixed,
            //
            // Returned from Current::commit when a transaction has
   10       // a mix of commits and rollbacks
            //
             HeuristicHazard,
            //
            // Returned from Current::commit when a transaction may have
   15       // a mix of commits and rollbacks
            //
        NO_PERMISSION };
        //
        // Returned from Current::commit or Current::rollback when
   20   // the caller is not the owner of the transaction
        //
        //
        // Exception thrown by Current Interface
        //
   25   class CurrentException
        {
        public:
```

- 25 -

```
     CompletionStatus completed() { return pCompleted; };
     //
     // Status of action. Currently only YES is ever returned.
     //
5    MinorError minor() { return pMinor; };
     //
     // Minor error of exception
     //

10   CurrentException() : pCompleted( COMPLETED_YES ) {};
     CurrentException( MinorError aMinor ) :
          pCompleted( COMPLETED_YES ),
          pMinor( aMinor ) {};

15   private:
     CompletionStatus pCompleted;
     MinorError pMinor;
     };

20   //
     // Current interface. All operations may throw a CurrentException
     // exception, except where noted.
     //
     class Current
25   {
     public:
          //
```

- 26 -

```
      virtual void begin() = 0;
      //
      // Begin the transaction
 5    // virtual void commit(ReportHeuristics report = kReportYes) = 0;
      //
      // Commit the transaction
10    // virtual void rollback() = 0;
      //
      // Rollback the transaction (if caller is owner of transaction)
15    // virtual void rollback_only() = 0;
      //
      // Mark the transaction to be rolled back at prepare time
20    // (used if caller is not owner of transaction)
      // virtual char* get_transaction_name()=0;
      //
25    // Return ascii, null terminated name of transaction. Returns
      // NULL when there isn't a current transaction.
      //
```

-27-

```
        };

//
        // Return a pointer to the singleton Current object
5       //
        class TXMgrFactory {
        public:
            static Current * getTXMgr(void);
        };
10      };
        -------------------------
         Private TXMgr interfaces
        -------------------------
        namespace ISTxP {
15      PUBLIC_NAMESPACE
        enum TransactionsVote { kCommit, kRollback };
        enum RegisterOutcome { kSuccess, kAlreadyRegistered,
        kNoTransactionStarted };
        enum Wait2ndPhase { kWaitYes = ISTx::kReportYes ,
20      kWaitNo=ISTx::kReportNo };
        enum ExceptionCondition { kNoTransaction, kHeuristicMixed,
        kHeuristicHazard };
        enum CommitStatus { kOk, kFailed, kHazard };
        class TXMgrRcvr {
25      public:
            virtual TransactionsVote prepare()=0;
            virtual CommitStatus    commit(Wait2ndPhase wait=kWaitYes) = 0;
```

- 28 -

```
        virtual void        rollback()=0;
    };
    class TXMgrX : public ISTx::Current {
    public:
5   TXMgrX();
        ~TXMgrX();
        RegisterOutcome registerRcvr(const char* string , TXMgrRcvr* rcvObj);
        void begin();
10      void commit(ISTx::ReportHeuristics report = ISTx::kReportYes);
        void rollback();
        void rollback_only();
        char* get_transaction_name();
            unsigned isTransaction();
15  void setLogData(const char* rcvrId, char* logData);
    };
    };
    #endif
```

Admin

The admin tool is used to bridge an interface between a human administrator and programmatic interfaces offered by internal classes. The general algorithm is to do the following:

- get a name context from the user
- present the user with either an existing or default set of property values for modification
- store the name context and set of property values This module presents no new objects.

Usage Scenarios

Figure 9:
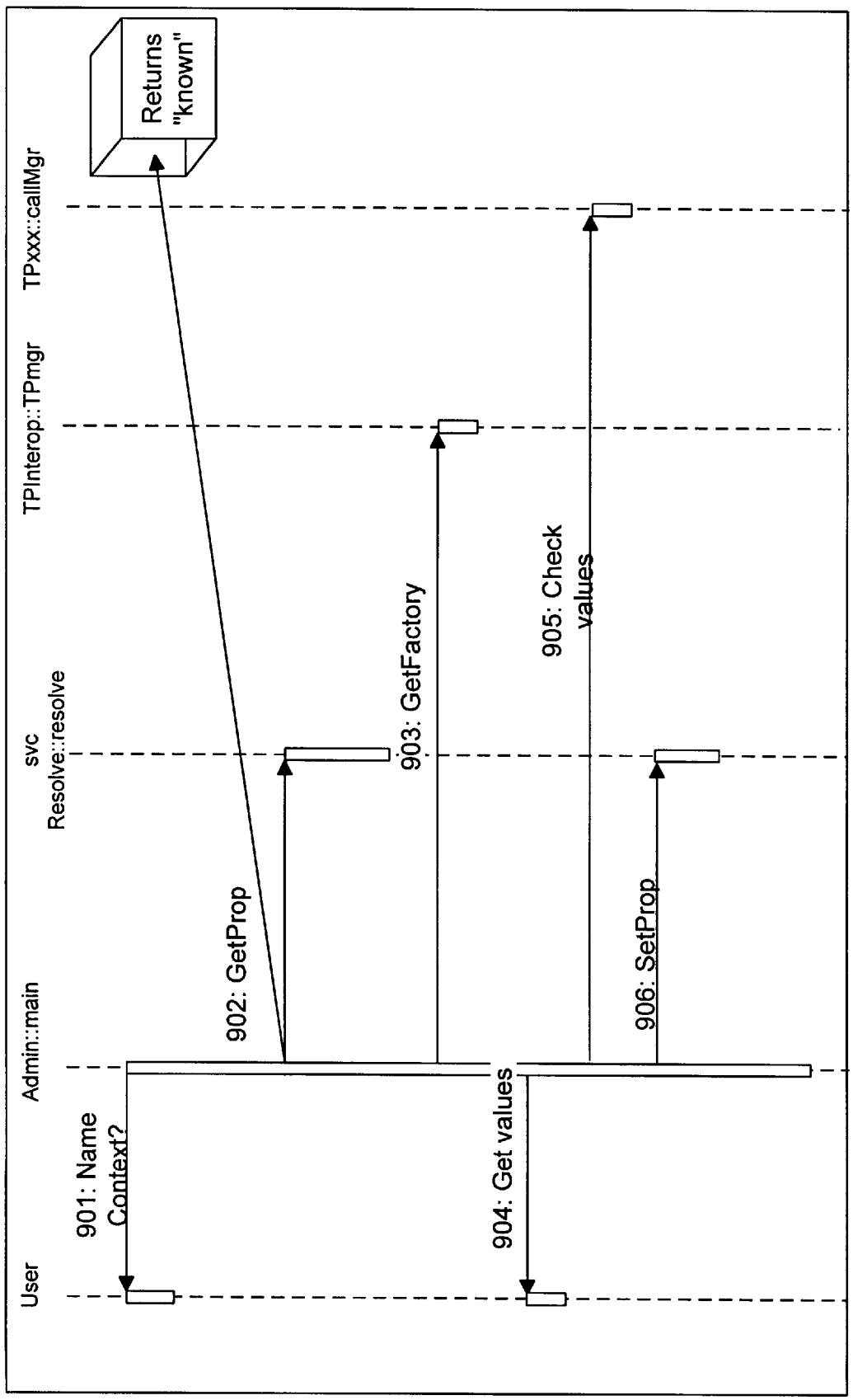
FIG. 9 illustrates a scenario where the naming context is known in accordance with a preferred embodiment.

FIG. 9 illustrates a scenario where the naming context is known in accordance with a preferred embodiment. An initial transaction querying for the name context 901 triggers a get property transaction from the admin tool to the Service resolver 902 which returns the "known" property. Then the admin tool sends out another transaction to get the factory 903 from the interoperability tool. The values are returned from the admin tool to the user 904. Then, a check of the values is initiated by the admin tool 905 and the properties are set in the service resolver 906.

Figure 10:
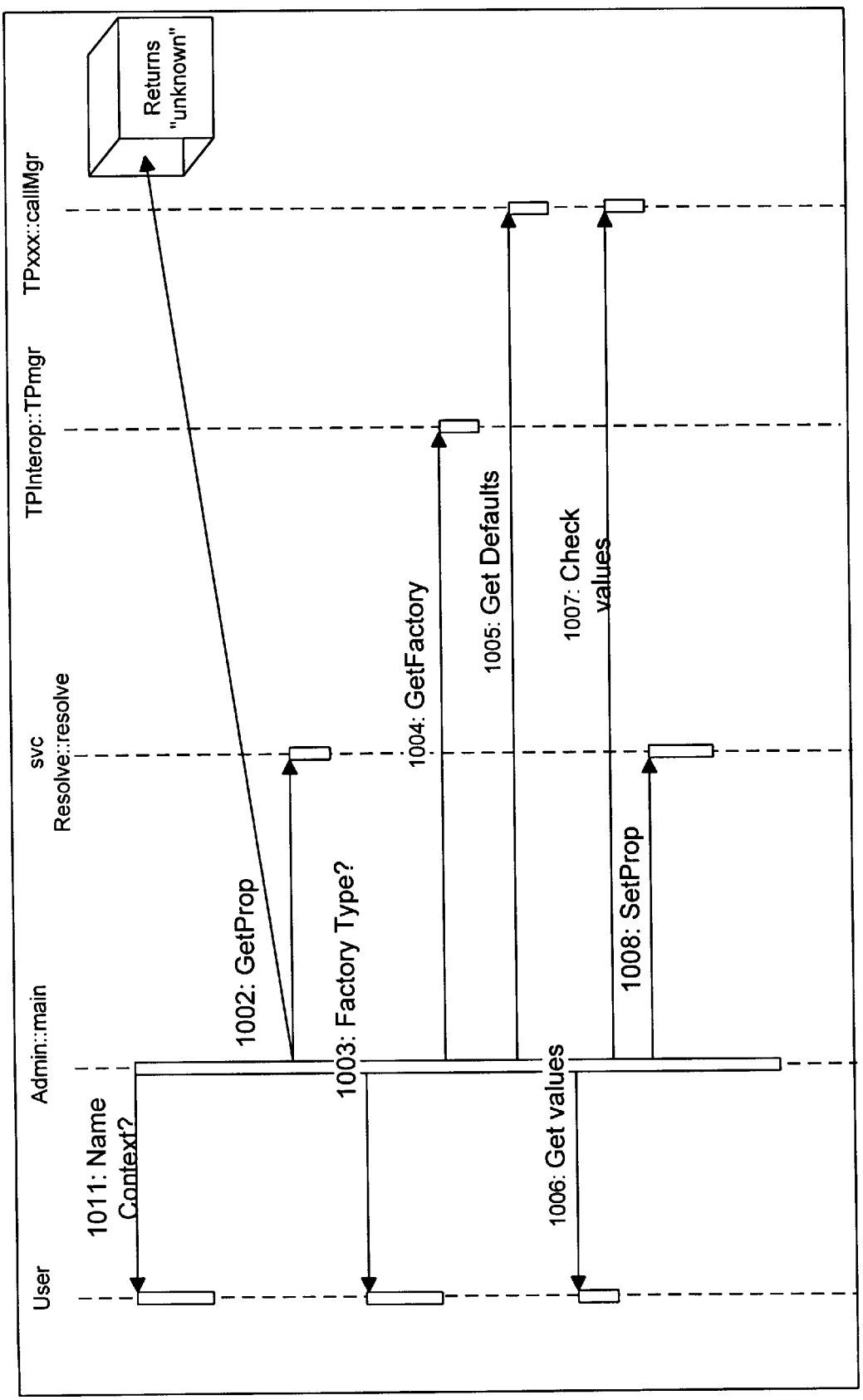
FIG. 10 illustrates a case where the naming context is unknown in accordance with a preferred embodiment.

FIG. 10 illustrates a case where the naming context is unknown in accordance with a preferred embodiment. An initial transaction querying for the name context 1011 triggers a get property transaction from the admin tool to the Service resolver 1002 which returns a "unknown" property. The user is queried for the factory type 1003. Then the admin tool sends out another transaction using the factory 1003 type to the interoperability tool to get the factory 1004 and to get the defaults from the TP manager 1005. The values are returned from the admin tool to the user 1006 to determine if they meet with user approval. Then, a check of the values is initiated by the admin tool 1007 and the properties are set in the service resolver 1008.

PropList

The property list classes encapsulate property list handling for various concrete TPInterop classes.

IDL

```
module propList {
    //
    // valueList operates on the dynamic portion
    // of a property list. A valueList consists of
    // "type", or "svcName" and a number of name/value
    // pairs that make up the property list.
    //
    interface valueList {
        string getValue( in string name );
        //
        // Returns the value for a name.
        // Memory ownership retained by callee
        //
        setValue( in string aName, in string aValue );
        //
        // Sets the value for a name.
        // Memory ownership retained by caller.
        //
        addName( in string aName, in string aValue );
        //
        // Adds a name and defaultValue
        // Memory ownership retained by caller
        string writeToString( );
```

- 31 -

```
//
// All name/values are written to a string.
// Memory ownership passes to caller
readFromString( in string buffer );
//
// All name/values are read from a string
// Memory ownership retained by caller
};
typedef RWHashDictionary ValueSequence;
typedef RWHashDictionaryIterator ValueSequenceIterator;
typedef RWCollectableInt ValueSequenceItem;
//
// Dict of possible values, with room for an int enum for each value
// key is RWCollectableString
// value is ValueSequenceItem
//
class HelpListItem : public RWCollectable {
public:
 HelpListItem() : possibleValues( 5 ) {};
 HelpListItem( const char *sh ) : shortHelp( sh ), possibleValues( 5 ) {};
 RWCString   shortHelp;
 ValueSequence possibleValues;
};
typedef RWHashDictionary HelpList;
typedef RWHashDictionaryIterator HelpListIterator;
//
// Dict of help list items.
```

- 32 -

```
        // key is RWCollectableString
        // value is HelpListItem
        //
        class CallMgrHelp {
 5      public:
                CallMgrHelp() {};
                virtual ~CallMgrHelp() {};
        virtual const ISPropListP::ValueList* getDefaultValueList() const = 0;
                //
10              // return the list of default values for this call mgr
                //
            virtual HelpList & getHelpList() = 0;
        //
        // return the help list for this call mgr
15      //
                virtual ReturnCode verifyValueList(const ISPropListP::ValueList* aList,
                        RWCString* offendingValue,
                        ISError* offendingReason) = 0;
        //
20      // verify the specified valuelist, return error if it is incorrect.
        // "offendingValue" is the name of the property that caused the error.
        // offendingValue may be NULL to stifle return value
        //
        virtual RWCString getTPName() const = 0;
25      //
        // return the name used the callMgr with ISInteropP::TPMgrX
        //
```

- 33 -

```
        virtual void verifyItem( const char *propertyName,
        const ISPropListP::ValueList*aList,
        const char **propertyString,
        int checkValue, int *propertyEnum,
5               RWCString* offendingValue );
        //
        // Implemented by this base class.
        //
        // Given a propertyName, returns the propertyString stored in the
10      // value list. throws an ISError if it can't get the propertyString
        // propertyString may be NULL to stifle the return.
        //
        // If checkValue is TRUE, look up the value & return the value of
        // one of the "possibleValues" of the helpListItem for this propertyName.
15      // throws an ISError if it isn't in range.
        //
        // offendingValue is set to the propertyName that caused the error.
        //
    };
20  //
    // Implementation of CallMgrHelp should be in a file named xxxhelp.cpp,
    // with no
    // references to external libs or DLLs. The object should be created with
    // the
25  // following method.
    //
```

- 34 -

```
//ISInteropP::CallMgrHelp*IScreateCallMgrXxxHelp(RWCString
//®name)
//
//
5   Code Implementation
    TuxCallMgrProperties::TuxCallMgrProperties(): theHelpList(5)
    {
       //
       // Create help list
10     //
       ISInteropP::HelpListItem*reqItem=newISInteropP::HelpListItem("Request
       Type");
          reqItem->possibleValues.insertKeyAndValue(new RWCollectableStri
       ng("REQUEST/RESPONSE"),new RWCollectableInt(kReqResp));
15        reqItem->possibleValues.insertKeyAndValue(new
       RWCollectableString("CONVERSATIONAL"),new RWCollectableInt(kConv
       ));
       theHelpList.insertKeyAndValue(new
       RWCollectableString("REQUESTTYPE"),
20     reqItem);
             defaultValueList.addName("REQUESTTYPE","REQUEST/RESPONSE"
       );
       ISInteropP::HelpListItem*bufItem = new ISInteropP::HelpListItem("Buffer
       Type");
25     bufItem->possibleValues.insertKeyAndValue(
       newRWCollectableString("FML"),
       new RWCollectableInt(0));
```

```
    bufItem->possibleValues.insertKeyAndValue(new RWCollectabl
    eString("FML32"), new RWCollectableInt( 1 ) );
    bufItem->possibleValues.insertKeyAndValue(
    newRWCollectableString("VIEW"),
5   new RWCollectableInt( 2 ) );
    bufItem->possibleValues.insertKeyAndValue(
    new RWCollectableString("VIEW32"),new RWCollectableInt( 3 ) );
    bufItem->possibleValues.insertKeyAndValue(new
    RWCollectableString("CARRAY"),new RWCollectableInt( 4 ) );
10  theHelpList.insertKeyAndValue(
    newRWCollectableString("BUFFERTYPE"),
    bufItem );
      defaultValueList.addName("BUFFERTYPE","FML");
    ISInteropP::HelpListItem*subItem = new ISInteropP::HelpListItem("Buffer
15  Sub Type");
    theHelpList.insertKeyAndValue(
    new RWCollectableString("BUFFERSUBTYPE"),
    bufItem );
      defaultValueList.addName("BUFFERSUBTYPE","");
20    ISInteropP::HelpListItem*txItem = new ISInteropP::HelpListItem("Start
    Transaction");
      txItem->possibleValues.insertKeyAndValue(new
    RWCollectableString("IMPLICIT"),new RWCollectableInt( kImplicit ) );
    txItem->possibleValues.insertKeyAndValue(
25  new RWCollectableString("NONE"),
    new RWCollectableInt( kNone ) );
      theHelpList.insertKeyAndValue(
```

- 36 -

```
        new RWCollectableString("STARTTRANSACTION"),
        txItem );
            defaultValueList.addName("STARTTRANSACTION","NONE");
        ISInteropP::HelpListItem*svcItem =
 5      new ISInteropP::HelpListItem("Service
        Name");
            theHelpList.insertKeyAndValue(
        new RWCollectableString("SERVICENAME"),
        svcItem );
10          defaultValueList.addName("SERVICENAME","");
        ISInteropP::HelpListItem*lenItem =
        new ISInteropP::HelpListItem("Buffer
        Length");
        theHelpList.insertKeyAndValue(
15      new RWCollectableString("BUFFERSIZE"),
        lenItem );
            defaultValueList.addName("BUFFERSIZE","1000");
        };
        TuxCallMgrProperties::~TuxCallMgrProperties()
20      {
        };
        RWCString TuxCallMgrProperties::getTPName()const
        {
            RWCString name("TPTUX");
25      return name;
        };
```

- 37 -

```
    const ISPropListP::ValueList*TuxCallMgrProperties::getDefaultValueList()
    const
    {
        return &defaultValueList;
5   };
    ISInteropP::HelpList&TuxCallMgrProperties::getHelpList()
    {
        ISInteropP::HelpList&helpList = theHelpList;
        return helpList;
10  };
    ISInteropP::ReturnCodeTuxCallMgrProperties::verifyValueList(const
    ISPropListP::ValueList*aList,
                    RWCString* offendingValue,
                    ISError* offendingReason)
15  {
        try {
        verifyItem("REQUESTTYPE",aList, NULL, 1, (int *) &reqType,
        offendingValue);
        int junk;
20      const char *buf;
        verifyItem("BUFFERTYPE",aList, &buf, 1, &junk, offendingValue);
        bufferType = buf;
        if ((bufferType == "VIEW") || (bufferType == "VIEW32")) {
            const char *subbuf;
25          verifyItem("BUFFERSUBTYPE",aList, &subbuf, 0, NULL,
        offendingValue);
            bufferSubType = subbuf;
```

- 38 -

```
        }
        verifyItem("STARTTRANSACTION",aList, NULL, 1, (int *) &startTxType,
        offendingValue);
        const char *name;
5       verifyItem("SERVICENAME",aList, &name, 0, NULL, offendingValue);
            serviceName = name;
            const char *size;
            verifyItem("BUFFERSIZE",aList, &size, 0, NULL, offendingValue);
            verifyBufferSize( size, "BUFFERSIZE" );
10      }
        catch( ISError ise ) {
            memcpy( offendingReason, &ise, sizeof( ISError ) );
            return ISInteropP::kFailure;
        }
15      return ISInteropP::kOk;
    };
    void TuxCallMgrProperties::verifyBufferSize(const char *propValue, const
    char *propName )
    {
20      if (sscanf( propValue, "%d", &bufferSize ) != 1) {
            throwISError("ISMGEN",3001, propName, propValue );
        }
    }

25  admin UI code:
    //
    // Assume user has told us factoryType = "TUXEDO" and
```

- 39 -

```
    // nameContext = "/accounts/checking/debit"
    //
    tuxMgr = TpMgr::getCallMgr(factoryType);
    // Check the svcResolver for an existing value string.
5   // if it exists, convert it, else create a new one
    // with defaults.
        PropList::valueList *aPropList;
        SvcResolver->getAttributes( nameContext, aPropList, factoryType );
    if (aPropList == NULL)
10  aPropList = tuxMgr->getDefaultValueList();
    }
    // get the static help properties
    anHPropList = tuxmgr->getHelpList( );
    // update the values somehow, use helpList if
15  // needed
    // write the values
    svcResolver->setAttributes( nameContext, aPropList, factoryType );
```

TP Interoperability

TPInterop::TPmgr executes on the gateway and accepts a request along with a description of the destination from front-end clients and delegates them to a specific interoperable object (e.g. TPCICS::CallContext, TPIMS::CallContext, TPTux::CallContext and TPPW::CallContext) according to the destination. Since the whole invocation is carried out in a distributed environment, parameters are passed via Extern::Streamable objects. Externalization referred in this section is based on OMG's Object Externalization Service Specification.

Detail Object Model

Figure 11:
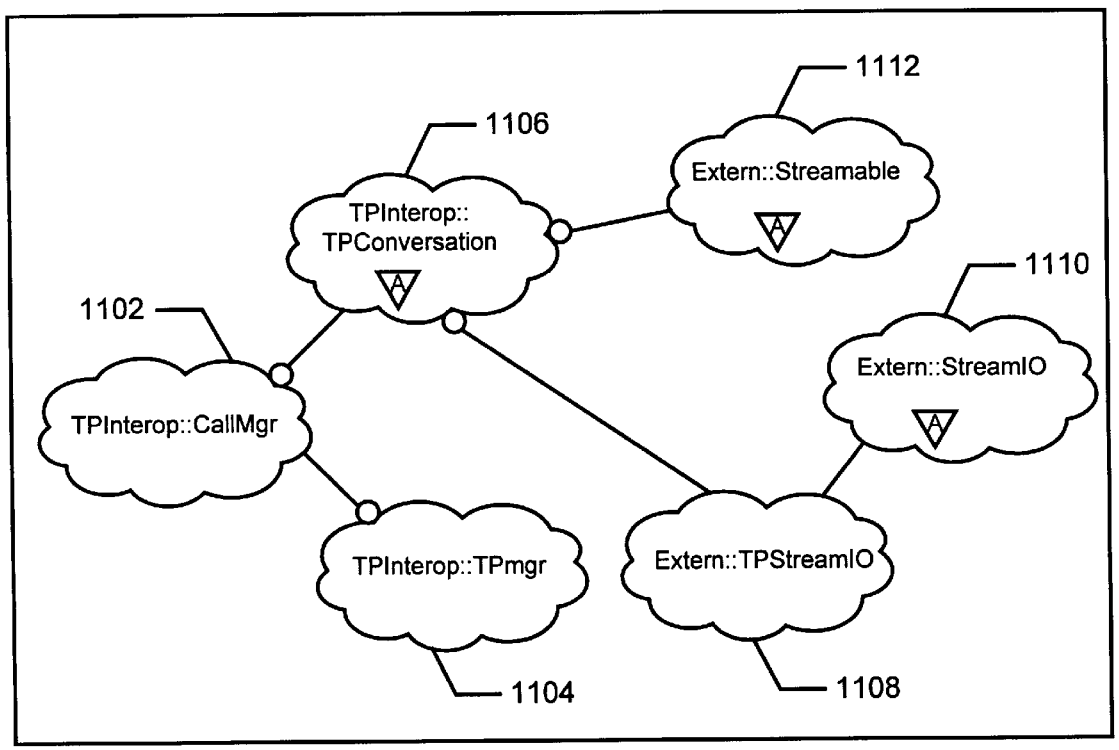
FIG. 11 is a Booch diagram of an object model of TPInterop in accordance with a preferred embodiment.

FIG. 11 is a booch diagram of an object model of TPInterop in accordance with a preferred embodiment. TPInterop::CallContext is an abstract base class. All subclasses have to override invoke method, and the method invokeObject on TPInterop::CallMgr 1102. TPInterop::TPmgr 1104 is the interface exported to the application. Since registerCallMgr is specific for TPInterop::CallMgr, TPInterop::TPmgr_Ex is used internally. There is only one instance of TPInterop::TPmgr 1104 per process. Each TPInterop::CallMgr object within the process registers itself with TPInterop::TPmgr object. RegisterCallMgr and unregisterCallMgr are the facilities provided by the TPInterop::TPmgr 1104 object.

An externalization service is a standard service for streaming objects to and from transport streams, persistent storage, etc. It consists of two main pieces: an abstract Extern::Streamable class 1112 which an application object inherits from, and an abstract Extern::StreamIO class 1110 which the externalization service provides an implementation for. Externalize is called by a TPIterop:TPConversation class 1106 which passes an Extern::StreamIO 1108 subclass object, and the object 1108 is expected to write its state out using the Extern::StreamIO::writeXxx calls 1110. When internalize is called, the object is expected to read its state from the Extern::Streamable object 1112 using the Extern::StreamIO::readXxx calls. The Extern::StreamIO class is similar in function to a C++ iostream class, but uses explicit method calls to read and write data types rather than use operator overloading.

- 41 -

```
        ISInterop
        class TPMgr {
 5      public:
            TPMgr();
            virtual ~TPMgr();
                    virtual ISError invoke( CallContext** cxt,
                        const char* destination,
10                      ISExtern::Streamable* request,
                        ISExtern::Streamable* Response) = 0;
            //
            // Call a service indicated by destination. Destination must
            // be a valid entry in the service name resolver database.
15          //
            // If cxt is not NULL, it may be set to a returned CallContext
            // whose memory is owned by the caller. If cxt is not NULL and
            // if no CallContext is returned, *ctx will be set to NULL.
            //
20          // request will be called with either the
            // Streamable::externalize_to_stream or externalize_to_tokenStream
            // methods, depending on the type of service.
            //
            // response will be called with either the
25      // Streamable::internalize_from_stream or internalize_from_tokenStream
            // methods, depending on the type of service.
            //
```

- 42 -

```
       virtual ISError setServiceNameDirectory(const char* aNameDirectory) =
       0;
            //
            // Sets the service name "directory" used to resolve destinations
 5          // on the invoke method.
            //

};
       class CallContext {
10     public:
            CallContext();
            virtual ~CallContext();
            virtual ISError invoke(ISExtern::Streamable*Request,
                      ISExtern::Streamable*Response) = 0;
15          //
            // Continuation of a service initiated by TPMgr::invoke.
            // request and response parameters are handled the same
            // as the TPMgr::invoke method.
            //
20     };

Module TPInterop
       class CallMgr : public RWCollectable {
       public:
25          CallMgr() {;};
            virtual ~CallMgr() {;};
              virtual ISError invokeObject( ISInterop::CallContext**,
```

- 43 -

```
                          const ISPropListP::ValueList* aList,
                          ISExtern::Streamable* Request,
                          ISExtern::Streamable* Response) = 0;
      };
5     //
      // The object should be created with the following method.
      //
      //   ISInteropP::CallMgr* IScreateCallMgrXxx( void )
      //
10
```

Major Behavior Description

A preferred embodiment provides the application developer with two transaction models: explicit model and implicit model.

The syntax of the code using explicit model is similarly to the following code segment:

tptxObject.Begin_Transaction( );
cicsObject.go(request1, response1);
cicsObject.go(request2, response2);
tptxObject.End_Transaction( );

In implicit model, invocation of invoke method starts and commits the transaction. The syntax of the code looks as follows:

tpinteropMgr.go("debit1", request1, response1);
tpinteropMgr.go("debit2", request2, response2);

Data and Format Conversion Between Systems

The purpose of this section is to identify the data conversion required for a specific TP component, running on the gateway platform and the server platform on which the TP server is running.

Little & Big Endian

Little and big Endian relates to the format integers (2 or 4 byte) are stored on a specific platform Floating point numbers are stored in different formats, e.g. IEEE.

Big Endian SUN, HP, RS/6000, Tandem, System/390 systems.

| Integer (2 byte) | 12 |
| Integer (4 byte) | 1234 |

Little Endian

Intel systems

| Integer (2 byte) | 21 |
| Integer (4 byte) | 4321 |

ASCII & EBCDIC

ASCII and EBCDIC formats relates to the way character data is formatted. The IBM System/390 platform is the only platform that uses the EBCDIC data format.

CICS & IMS LU6.2

| Gateway Platform | Server Platform | Endian Conversion | Data Representation Conversion |
|---|---|---|---|
| Intel - (NT,OS/2) | S/390 (MVS) | Little Endian to Big Endian | ASCII to EBCDIC |
| RS\6000 - (AIX) | S/390 (MVS) | None | ASCII to EBCDIC |
| SPARC - SUN | S/390 (MVS) | None | ASCII to EBCDIC |
| HP-PA 7100 - HP | S/390 (MVS) | None | ASCII to EBCDIC |

Pathway

| Gateway Platform | Server Platform | Endian Conversion | Data Representation Conversion |
|---|---|---|---|
| Intel - (NT,OS/2) | Tandem | Little Endian to Big Endian | None |
| RS/6000 - (AIX) | Tandem | None | None |
| SPARC - SUN | Tandem | None | None |
| HP-PA 7100 - HP | Tandem | None | None |

Tuxedo

Note: the Tuxedo workstation service performs internal little and big Endian conversions.

| Gateway Platform | Server Platform | Endian Conversion | Data Representation Conversion |
|---|---|---|---|
| Intel - (NT,OS/2) | SUN/HP | None | None |
| RS/6000 - (AIX) | SUN/HP | None | None |
| SPARC - SUN | SUN/HP | None | None |
| HP-PA 7100 - HP | SUN/HP | None | None |

Externalization

The OMG Externalization Service is a standard service for streaming objects to and from transport streams, persistent storage, etc. It consists of two main pieces an abstract Extern::Streamable class which an application object inherits from, and an abstract Extern::StreamIO class which the externalization service provides an implementation for.

The Extern::Streamable class provides to methods: externalizeToStream, and internalizeToStream. When externalize is called, an Extern::StreamIO subclass object is passed to the application object, and object is expected to write its state out using the Extern::StreamIO::writeXxx calls. When internalize is called, the object is expected to read its state from the Extern::StreamIO subclass object using the Extern::StreamIO::readXxx calls. The Extern::StreamIO class is similar in function to a C++ iostream class, but uses explicit method calls to read and write data types rather than use operator overloading.

The externalization service acts as a bridge between the TP monitor communication buffer and the ORB world. The application object creates a request and reply object. The request object supports the externalize function to create a request buffer for the TP link object, and the reply object supports the internalize function to read the reply buffer. The request and reply object act as a bridge between the ORB world and the TP monitor world—the TP monitor buffers are never seen, but the request and reply objects know the exact order of the data in

Data Types

The following data types are supported: char*, char, octet, short, unsigned short, long, unsigned long, float, double and bool, where both bool and octet are defined as unsigned short.

StdStreamIO's data format is OMG Object Externalization Specification compliant. TPStreamIO's data format is different. It does not have data type and data length fields. TPStreamIO is the class used for externalization and internalization at Stage1A.

- 47 -

IDL

```
module extern {
typedef void* bufPtr;
interface StreamIO {
// All the following methods should be overwritten.
    void writeChar(in char aChar);
    void writeOctet(in octet aOctet);
        ...
    char readChar( );
    octet readOctet();
};

interface TPStreamIO : StreamIO {
```

- 48 -

```
        void setOutputBuffer(in bufPtr aBuffer, in long length);
        long getOutputBufferLength();
        long getDataLength();

5       void writeChar(in char aChar);
        void writeOctet(in octet aOctet);
            ...
        char readChar( );
        octet readOctet();
10  };

interface streamable {
        void externalize_to_stream(in streamIO aStream);
        void internalize_to_stream(in streamIO aStream);
15  };

interface TPStreamIOFactory {
        enum streamDestination { RS6000, HP, INTEL, TANDEM, IBM370,
        SUNSPARC, POWERPC };
20      createTPStreamIO( in streamDestination theDestination );
    };
```

TPStreamIO provides methods to set up the buffer pointer, for the reason that Tuxedo needs to use buffer allocated by its own memory allocation APIs.

Data Format Conversion

Since the Gateway platform and Server platform might be different, and different platforms might have different scheme for data representation, program running on Gateway need converting the data format to be compliant with that of the server platform. The following tables show what operations need to be performed for data conversion based upon different Gateway and Server platform configurations.

Figure 12:
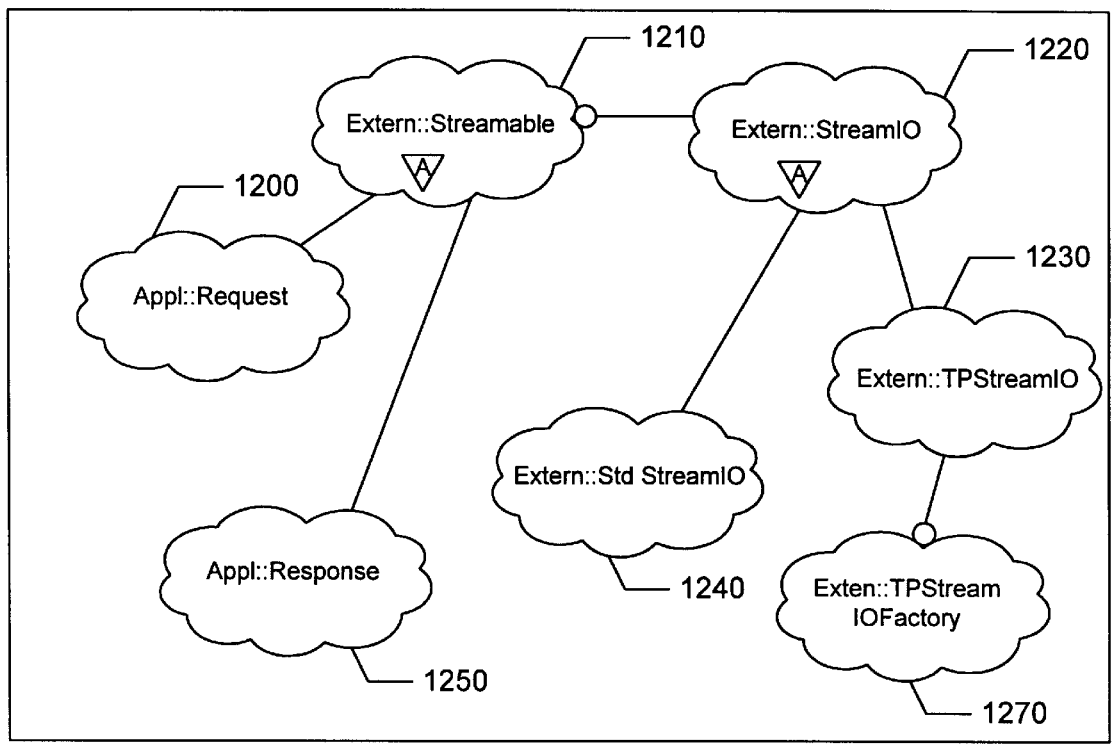
FIG. 12 is a Booch diagram of externalization processing in accordance with a preferred embodiment.

FIG. 12 is a Booch diagram of externalization processing in accordance with a preferred embodiment. Every Extern-::TPStreamIO 1220 object has two internal flags of bool types; they are flagLtoB and flagAtoE. When an Extern-::TPStreamIOFactory 1270 is asked to create an Extern::TPStreamIO 1230, it must be given the information about Gateway platform and Server platform. According to the message, it looks up the table and sets the flags of the Extern::TPStreamIO 1230 correspondingly. When the Extern::TPStreamIO 1230 object is asked to write or read, it will check those flags also. The Extern::TPStreamIOFactory 1270 object is a singleton object.

Interactive Diagram

Figure 13:
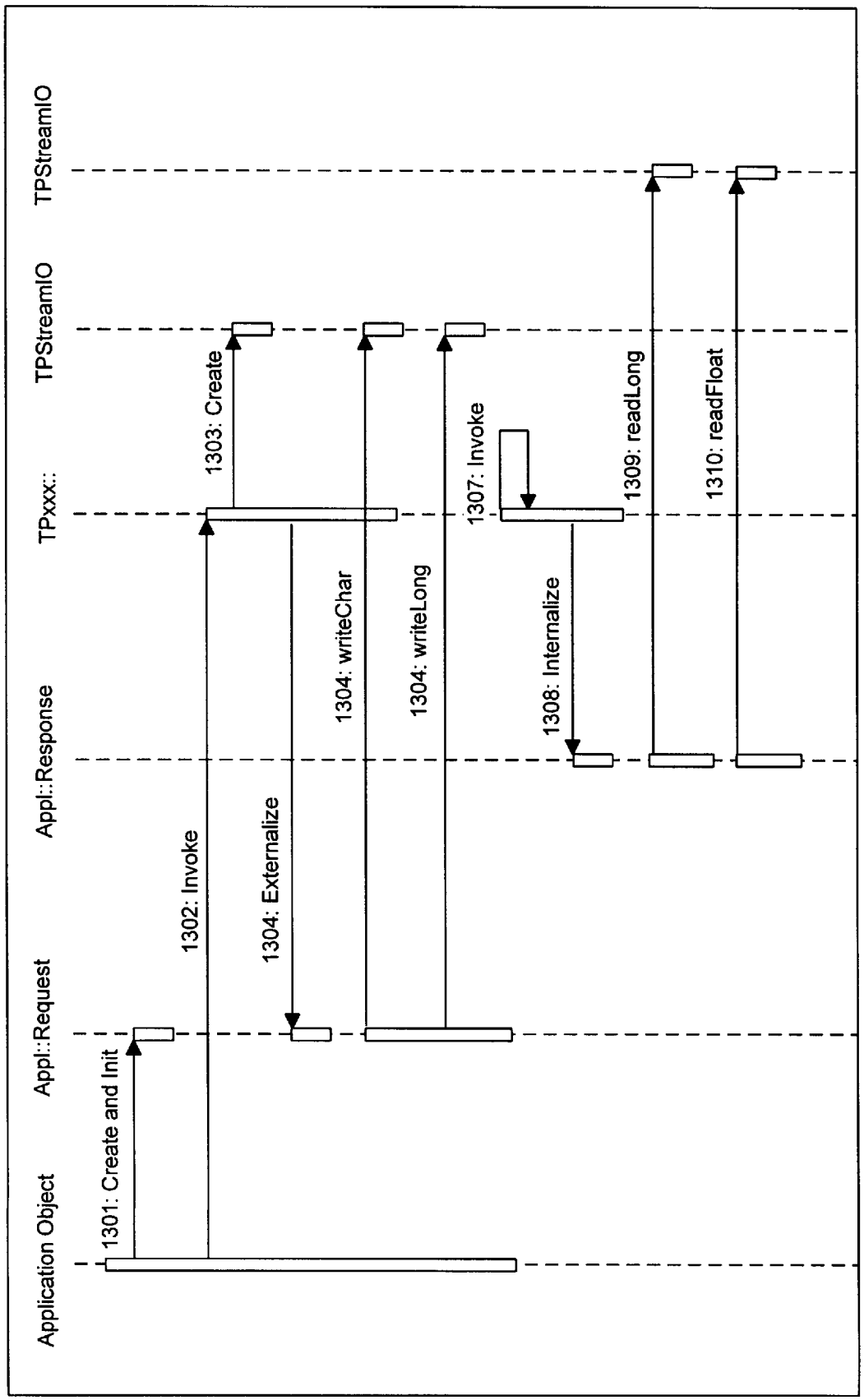
FIG. 13 illustrates a simple interaction for an application object using a request object to help the TPXXX object build a request buffer, invoke the request and send back the response.

FIG. 13 illustrates a simple interaction for an application object using a request object to help the TPXXX object build a request buffer, invoke the request and send back the response.

CORBA ORB portability

To minimize dependencies on the ORB, the concrete implementation of the streamIO objects should be built as stand-alone C or C++ objects, with the ORB implementation classes delegating work to the C++ classes.

Non-CORBA ORB portability

Most distributed object managers have this notion of object streaming, and there is only so much variation. Using the same technique as for "CORBA ORB portability", any future service, such as an Distributed OLE streaming mechanism, can be used.

ISNaming and SvcResolve

The OMG naming service is the principal means for objects to locate other objects. The names given to the objects should be easily recognizable and readable within the problem domain of the application. The naming service will map these user-defined "names" to object references. The name-to-object association is called a "name binding". A "naming context" is an object that contains a set of "name bindings" in which each name is unique. Every object has a unique object ID or reference. One or more names can be associated with the same object reference at the same time, however there is no requirement for all objects to be named.

Because a naming context is an object, it too can be bound to a name in a naming context. Binding naming contexts to other naming contexts creates a "naming graph". The "naming graph" is a directed graph or tree where the nodes are naming contexts and the leaves are name bindings to non-naming context objects. Given a context in a naming graph a sequence of names can reference an object.

ISNaming Naming contexts and names

In the OMG Naming service a "name component" is a structure with two attributes, an identifier which includes the object's name string, and a kind which includes a string that is a description of the objects name, ie. file type etc. A name with a single "name component" is called a "simple name", a name with "multiple components" is called a "compound name." Each component except the last is used to name a context; the last component denotes the bound object.

The kind attribute for the Name component will be assumed to be NULL and will be omitted from the NameComponent definition. Compound names will simply be defined as a unique string similar to a directory name in common PC files systems, with a "/" character delimiting each substring representing the NameComponent within the compound name. Names are specified without the trailing "/" character, the process of binding a name to a context will be equivalent to the operation of adding the "/" character to the string. The following names
BANKING/RETAIL/CHECKING/DEBIT
and
BANKING/RETAIL/CHECKING/CREDIT
refer to bound objects.

SvcResolve

The SvcResolve class provides a naming service and server for names and objects associated with the TPInterop::TPMgr. It maintains naming contexts and name-object associations for TPInterop::CallMgr objects and sub-classes for this release.

Object Model

Figure 14:
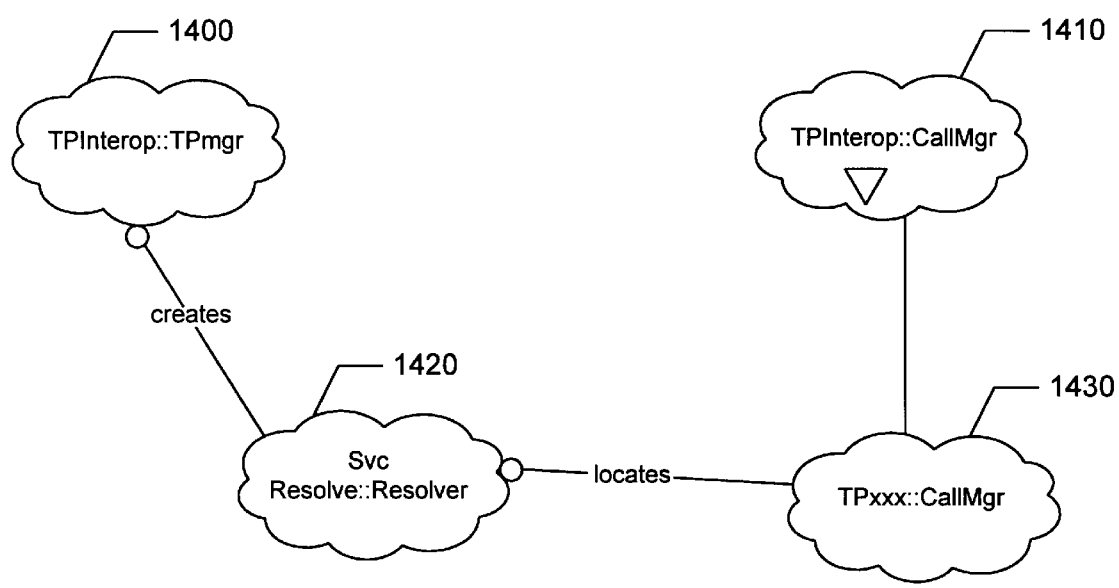
FIG. 14 is a Booch diagram illustrating the relationship between objects in accordance with a preferred embodiment.

FIG. 14 is a Booch diagram illustrating the relationship between the TPInterop::TPMgr 1400, TPInterop::CallMgr 1410, TPInterop::CallContext 1420 classes and the SvcResolve::Resolver 1420 naming service components.

- 52 -

IDL Classes

```
5   module ISNaming {
    interface Name {
    attribute string   name;
    };
    interface NamingContext {
10  attribute string   name;
    attribute popList::valueList  currentPropList;
    void bind( in Name name,  in ObjectRef ref);
    void rebind(in Name  name,  in ObjectRef ref) ;
    void bindWithPropertyList( in Name name,
15  in SvcResolve::ObjectRef  ref,
    in propList::valueList  pl);
    void rebindWithPropertyList(in Name  name,
    in SvcResolve::ObjectRef ref ,
    in propList::valueList  pl);
20  void bindContext( in Name name, in  NamingContext cxt);
    void rebindContext( in Name name, in  NamingContext cxt);
    void bindContextWithPropertyList( in Name name,
    in NamingContext cxt ,
    in propList::valueList p1);
25  void rebindContextWithPropertyList(in Name  name,
    in  NamingContext cxt ,
    in propList::valueList pl);
```

- 53 -

```
    SvcResolve::ObjectRef  resolve( in Name  name) ;
    void unbind(in Name  name);
    NamingContext  newContext();
    NamingContext  bindNewContext(in Name name) ;
5   void  setPropertyList(in Name name,
    in propList::valueList propstring);
    void  removePropertyList(in Name name,
    in propList::valueList  propstring);
    propList::valueList getPropertyList(in Name name);
10  };
    interface NamingGraph {
    NamingContext get_context(in NamingContext  root_cxt ,
    in  string  compound_name);
    void  buildGraph(in NamingContext  root_cxt ,
15  in string  compound_name);
    void destoryGraph(in NamingContext  root_cxt,
    in string  compound_name);
    void bindGraph(in NamingContext cxt,
    in string compound_name ,
20  in SvcResolve::ObjectRef ref);
    void unbindGraph(in NamingContext cxt,
    in string  compound_name,
    in SvcResolve::ObjectRef ref);
    };
25  };
    module SvcResolve {
    interface ObjectRef {
```

```
    attribute string<512> ref;
};
interface Resolver {
ObjectRef  resolveTPServiceDestination(in string  name,
out  propList::ValueList);
ISNaming::NamingContext  locateGlobalNamingContext();
void  setGlobalNamingContext(in string  cxt);
void  addTPServiceDestination(in string  name,
in ObjectRef  Factory,
in propList::valueList pl);
void  deleteTPServiceDestination(in string  name);
void  changeTPServiceDestination(in string  name,
in ObjectRef  Factory,
in propList::valueList pl);
};
};
```

Usage examples and scenarios Names to Object Table

The following table maps name/naming contexts to objects.

| Name/Naming Context | Reference | Property List |
|---|---|---|
| /BANK/RETAIL/CHK/DEBIT | TUXEDO | RequestType = request/response BufferType = VIEW startTx = YES |
| /BANK/RETAIL/CHK/CREDIT | TUXEDO | RequestType = request/response BufferType = VIEW startTx = YES |
| /BANK/COMM/TRADE/BOND/SELL | CICS | CICSPGM = CICSAPP |
| /BANK/COMM/TRADE/BOND/BUY | CICS | CICSPGM = CICSAPP |
| /BANK/RETAIL/SAV/DEBIT | IMS | TRANCODE = SAV001TR |
| /BANK/RETAIL/SAV/CREDIT | IMS | TRANCODE = SAV002TR |

```
5
        // The following objects can be assumed to be initialized ;
        SvcResolver::Resolver*  svc;
           TPIMS::TPCallMgr*    tpims;
           TPTux::TPCallMgr*    tptux;
10      TPInterop::CallMgr* tpcallmgr;
        TPInterop::TPMgr*   tpMgr;

//The following  sample  illustrates the maintenance functions required
        //to define a Checking Account Debit from Tuxedo and a Savings
15      Account //Credit to IMS.
        // Assumes tptux and tpims already created by TPInterop
```

- 56 -

```
    CallMgrFactory
    tpmgr->registerCallMgr("TUXEDO", tptux );
    tpmgr->registerCallMgr("IMS", tpims );
    tpMgr->setGlobalNamingContext("BANKING/RETAIL");
5
    aPropList* pl = new propList();
    pl->addName("requestType", "request/response");
    pl->addName("bufferType", "VIEW");
    pl->addName("startTx", "YES");
10
    aPropList* p2 = new propList();
    p2->addName("trancode", "SAV002TR ");

svc->addTPServiceDestination("CHECKING/DEBIT", "TUXEDO", p1);
15  svc->addTPServiceDestination("SAVINGS/CREDIT" , "IMS",   p2);
    // The following illustrates the sample coding of the
    // addTPServiceDestination maintenance function
    SvcResolve::Resolver::addTPServiceDestination( const char* name,
    SvcResolve::ObjectRef* ref,
20  propList::valueList* pl)
    {
        ...
    ISNamingGraph graph;
    ISNaming::NamingContext* cxt = getGlobalNamingContext;
25  graph.bindGraph(cxt, name, ref);
    cxt->bindWithPropertyList(name, ref , pl);
        ...
```

- 57 -

```
    }
    // The following sample illustrates the coding ISNaming and
    SvcResolve
    // coding required in the TPMgr::invoke method..
5   TPInterop::TPMgr::invoke( const char* destination, ... )
    {
    ...
    SvcResolve::ObjectRef*  ref;
    propList::valueList  pl;
10  ref = (string)  resolveTPServiceDestination(Destination , &pl);
    TPCallMgr*  mgr = getCallMgr(ref);
    ...
    }
```

TPInterop::TPMgr Interaction

Figure 15:
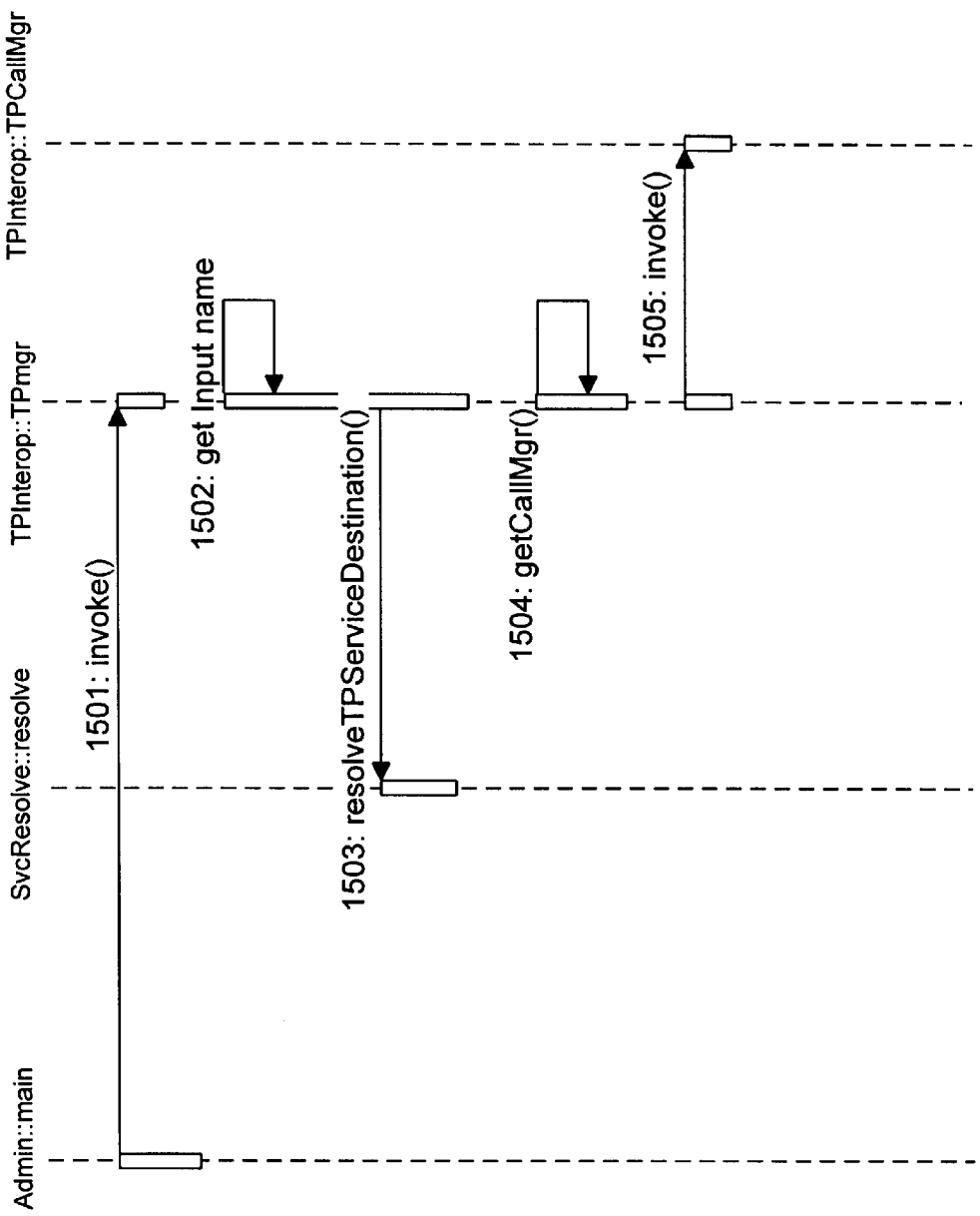
FIG. 15 is a Booch diagram illustrating the Interaction processing in accordance with a preferred embodiment.

FIG. 15 is a Booch diagram illustrating the Interaction processing in accordance with a preferred embodiment. The TPInterop::TPMgr creates the SvcResolve::Resolver object, (during its initialization or startup). and calls the SvcResolve::Resolver method "setGlobalNamingContext"

1. The Application is activated, and calls the TPInterop::TPMgr method "invoke" with the following parameters as shown at 1501.

Name representing the TPInterop::CallMgr application streamable input object.

application streamable output object.

2. The TPInterop::TPMgr get the input name representing the TPInterop::CallMgr object as shown at 1502.

3. The TPInterop::TPMgr calls resolveTPServiceDestination on the SvcResolve::Resolver object with the name representing the transaction as an input parameter. The method returns an object reference, and the associated property list as shown at 1503.

4. The TPInterop::TPMgr calls the getCallMgr method with the object reference obtained in 3) to locate the appropriate TPInterop::CallMgr object as shown at 1504.

5. The property list is used as input for the invoke method on the TPInterop::TPCallMgr object as shown at 1505.

TPxxx—Typical TP Monitor Model

This section describes a typical implementation of a set of TPxxx classes, such as TUXEDO, CICS, etc.

Object Model

Figure 16:
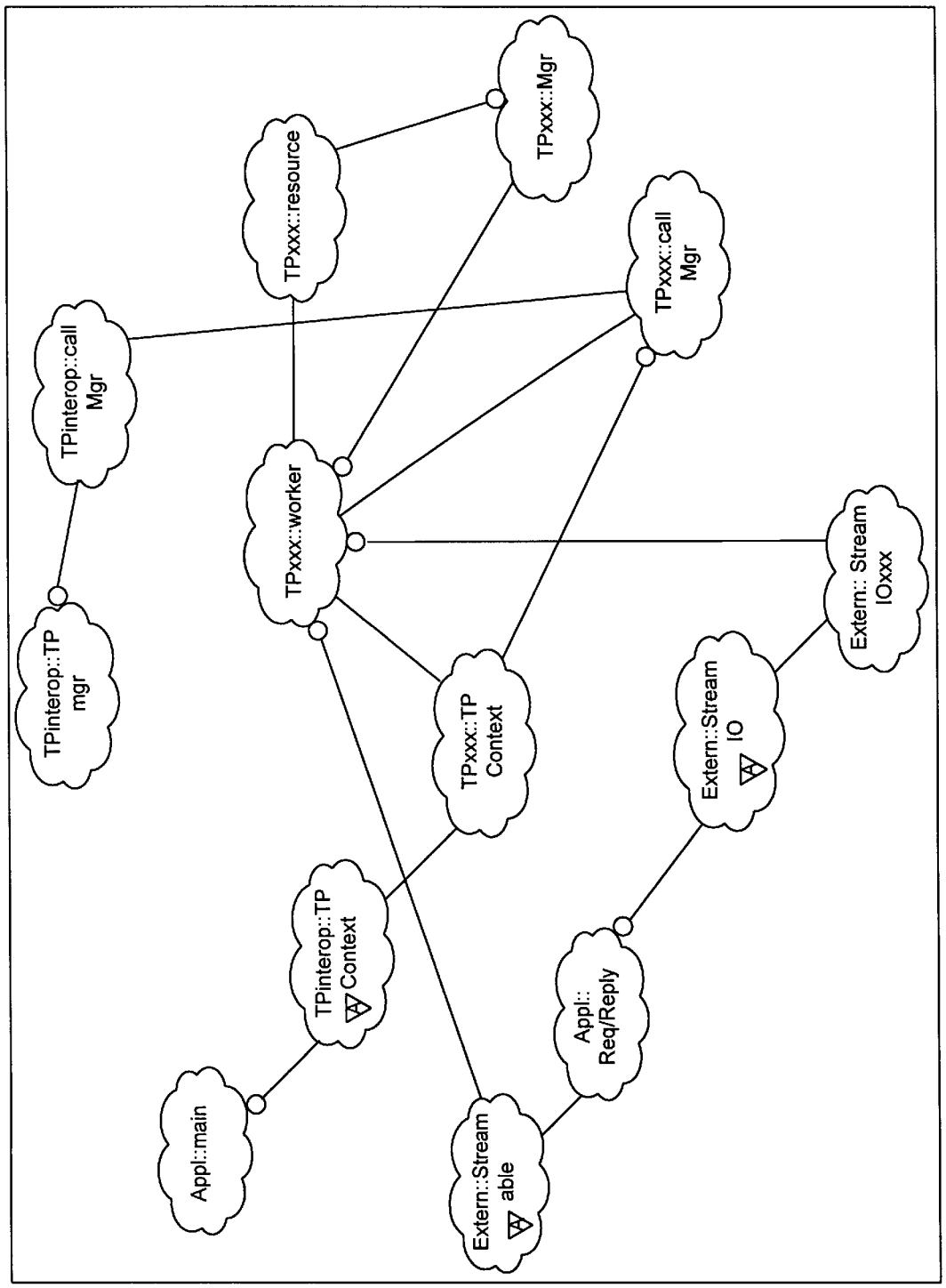
FIG. 16 is a Booch diagram setting forth the architecture of the TP monitor in accordance with a preferred embodiment.

FIG. 16 is a Booch diagram setting forth the architecture of the TP monitor in accordance with a preferred embodiment.

IDL

A typical implementation of TPxxx classes introduces no new methods, but overrides the abstract class interfaces shown in the object model.

Usage Scenarios

See the scenario in the overview chapter for an overview, and see the specific TPxxx chapters for specific details.

CICS

Figure 17:
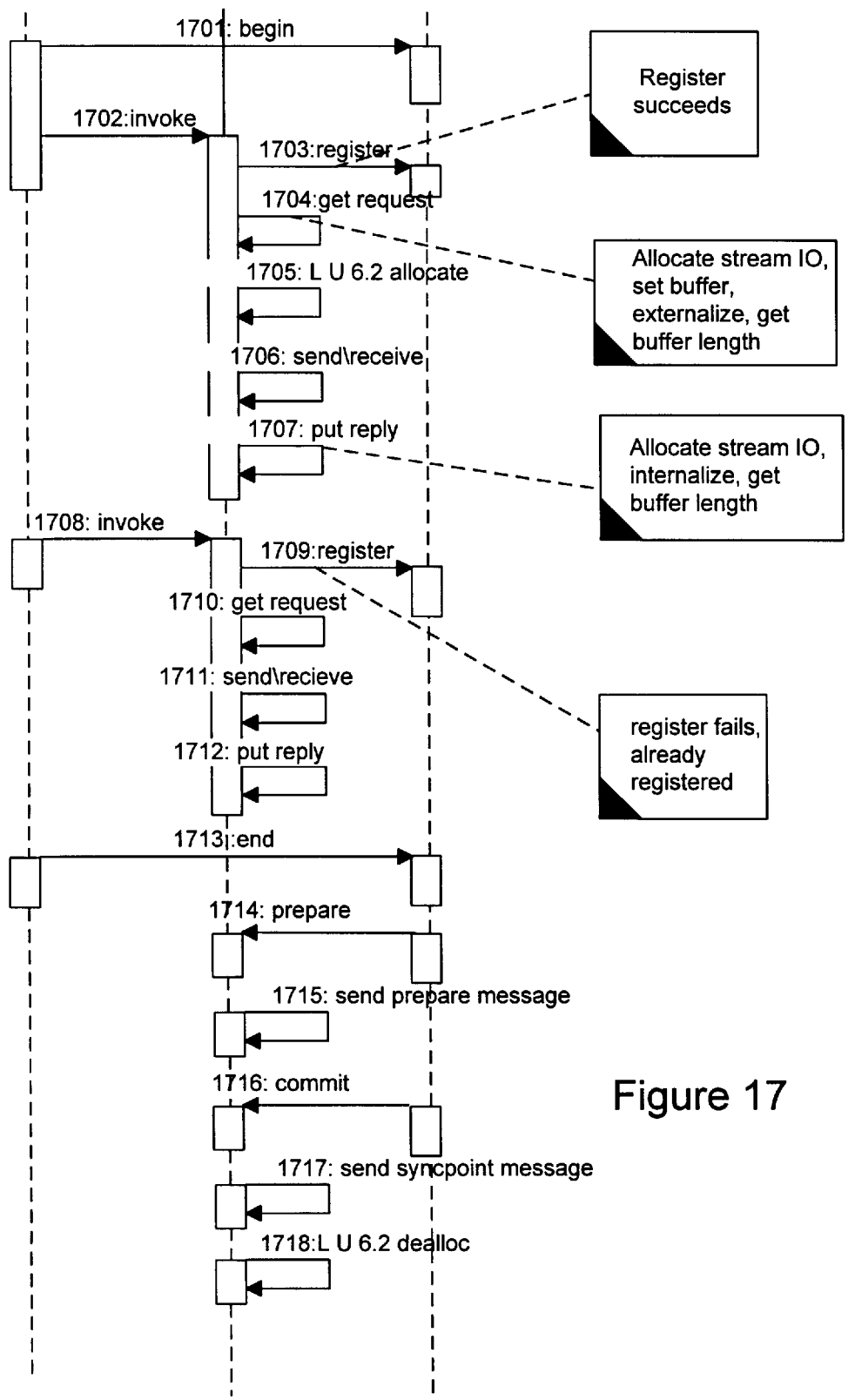
FIGS. 17 and 18 set forth some details of CICS processing in accordance with a preferred embodiment.
Figure 18:
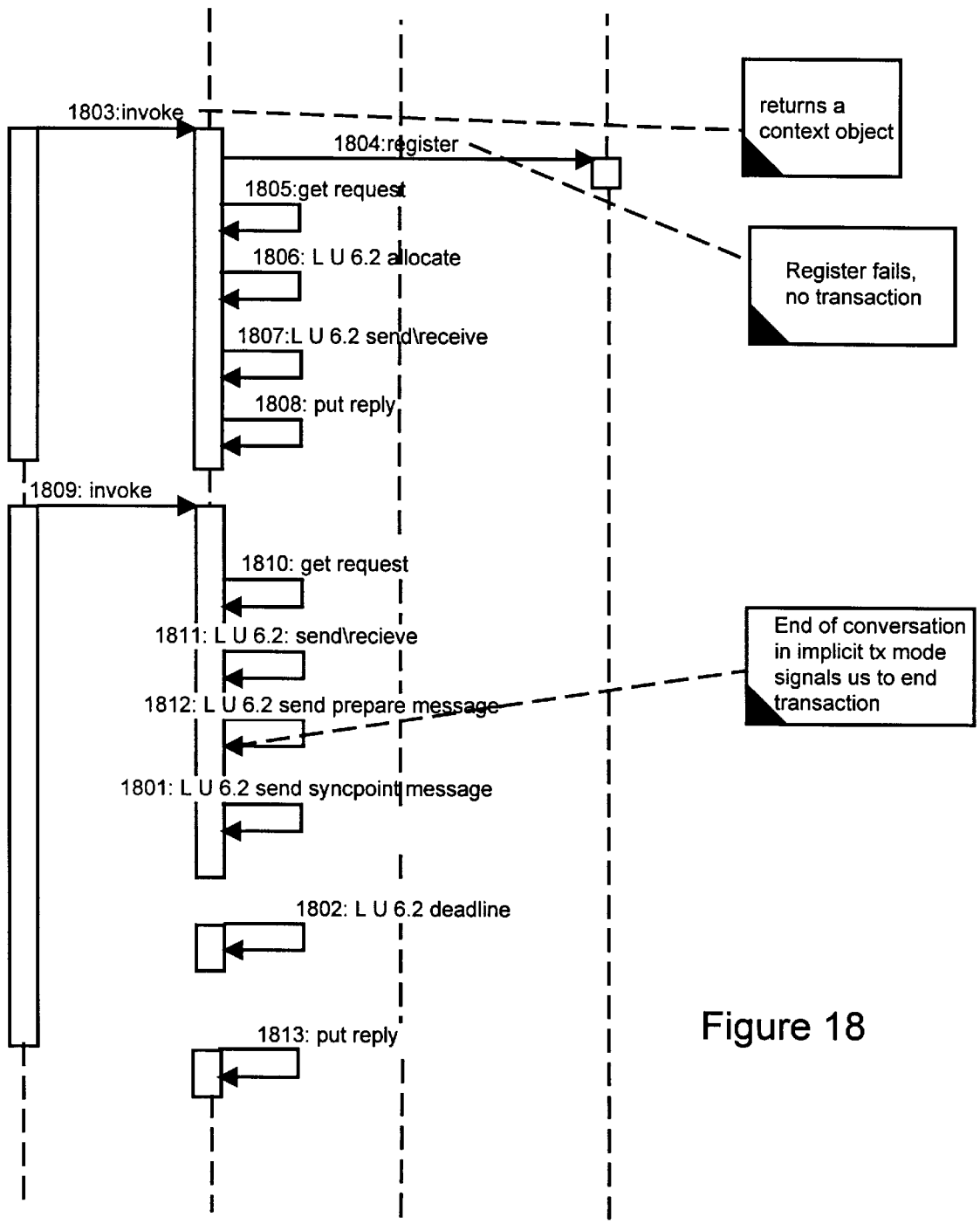

FIGS. 17 and 18 set forth some details of CICS processing in accordance with a preferred embodiment. The purpose of this component is to provide connectivity between the TP inter-operability module and a CICS system running on another computer. Connectivity to CICS is achieved through the CICS LU 6.2 service and the CICS user transaction is invoked via the CICS Program Link interface. The LU 6.2 service allows a client LU 6.2 application (written to the basic LU 6.2 level or using the CPIC interface) to connect to a CICS system running on a server through the CICS LU 6.2 service. A CICS LU 6.2 transaction will be provided by this project to inter-operate with the CICS LU 6.2 service and the client LU 6.2 application. The CICS LU 6.2 transaction will convert the data received from an LU 6.2 client and then perform a CICS Program Link command to invoke the appropriate CICS user application.

In FIG. 17, processing commences at 1701 and immediately passes to 1702 to invoke a transaction and connect to a CICS LU 6.2 service. At 1703 a register operation occurs and a get request 1704 to allocate a streamIO, setbuffer, externalize the transaction and obtain the buffer length. Then, at 1705 a LU 6.2 allocate operation is performed and at 1706 a send operation is performed. Finally, at 1707, a put reply is performed to allocate streamIO, internalize the transaction and obtain the buffer length of the transaction. A second invoke operation 1708 is performed in which the first operation is a register operation 1709 which will fail since the transaction is already registered. Then a get request 1710 is performed which initiates a send/recieve 1711 transaction which invokes a put reply 1712 and ultimately an end transaction 1713 which invokes a prepare 1714 transaction and sends a prepare message 1715 which results in a commit 1716 and a syncpoint message 1717 and ultimately an LU 6.2 dealloc 1718.

In FIG. 18 processing commences at 1803 where an invoke operation occurs which returns a context object. Then, at 1804 a register operation is performed which fails if there is no transaction. At 1805, a get request is sent and at 1806 an LU 6.2 allocate operation is performed which is followed by an LU 6.2 send/recieve 1807 and a put reply 1808 is used to transmit the transaction to the CICS system. At 1809 another invoke operation is performed and a get request 1810 is utilized to initiate a send/receive transaction 1811 which prepares a message to send 1812 and invokes a send syncpoint message 1801 which results in an LU 6.2 deallocate operation 1802 and a put reply 1813.

The CICS Program Link interface requires a program name which is the name of the CICS user application that will be invoked. This program will run under CICS transaction id associated with the user program. The Program Link interface also requires an input and output buffer the so called Commarea. The Commarea is used for both input and output data. The input data will be as a result of the object attributes being streamed and the output data will be the data returned by the CICS user application.

The connectivity between the CICS inter-operability module and CICS system will be via LU 6.2. The CPIC interface can be used to perform the LU 6.2 communication using sync level 1 or confirm protocol.

Usage Scenarios

See the "overview" chapter for a generic interaction diagram. The following are some specific details.

Usage Notes

In conversational or request/response mode, it is invalid for there to be a NULL request and/or reply object.

If there is not a current transaction, the StartTransaction property will be checked. If it is set to yes, a transaction will be committed at the end of a successful LU 6.2 send/receive (request/response mode) or at the end of a conversation (conversational mode) initiated by LU 6.2 allocate.

CICS transactions are started implicitly by the first EXEC CICS LINK request.

Request/response will always return a nil callContext object. Conversational mode always returns a callContext object, unless the conversation is ended on the LU 6.2 deallocate.

Service Parameters

The following service parameters are defined:

| Name | Description | Values |
|---|---|---|
| Partner Name | Name of CPIC side file | char [8] |
| Program Name | Name of CICS application program | char [8] |
| Start Transaction | Start a transaction when there isn't a current one | Implicit, None |

IMS

Figure 19:
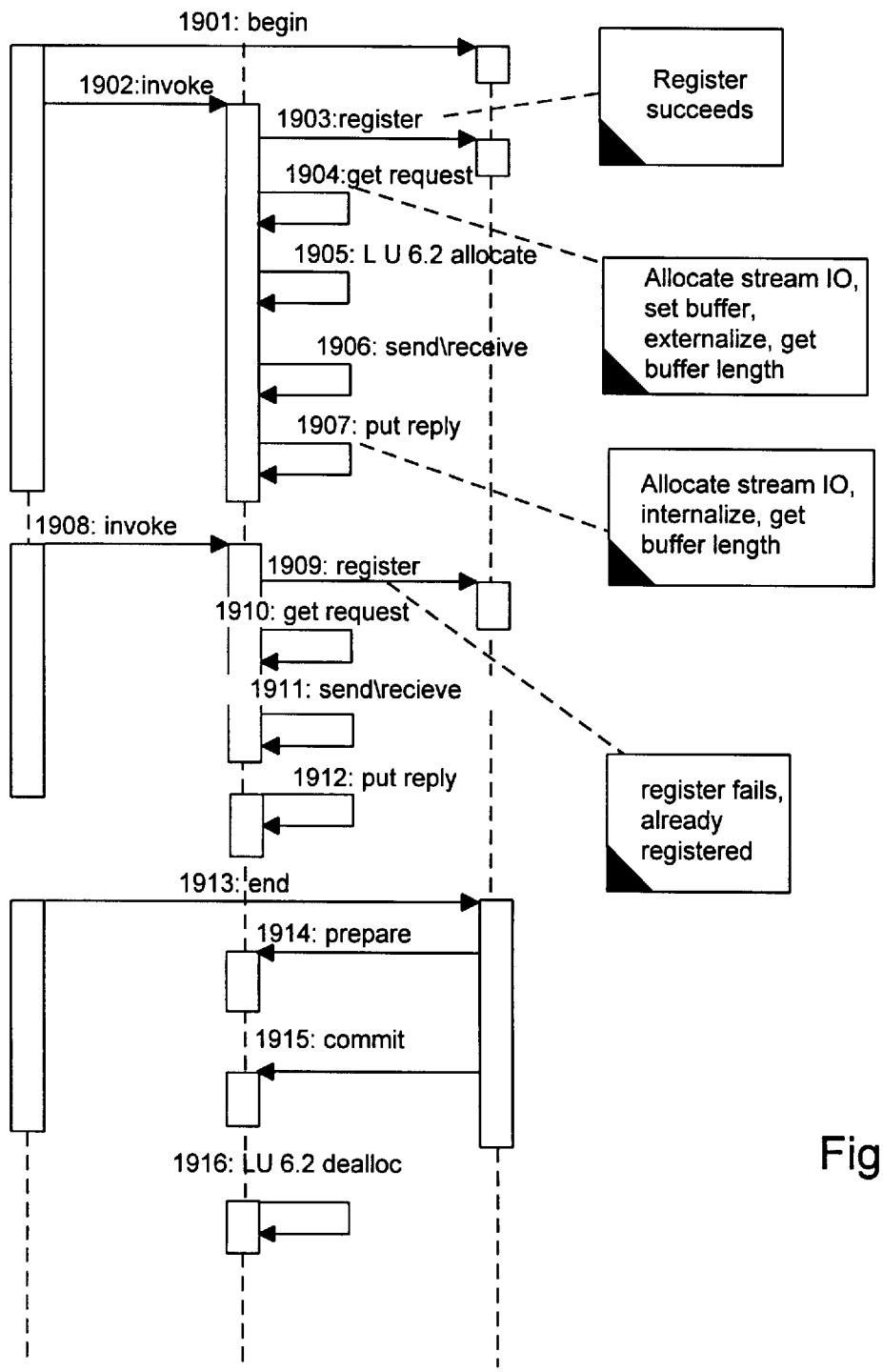
FIGS. 19 and 20 set forth some details of IMS processing in accordance with a preferred embodiment.
Figure 20:
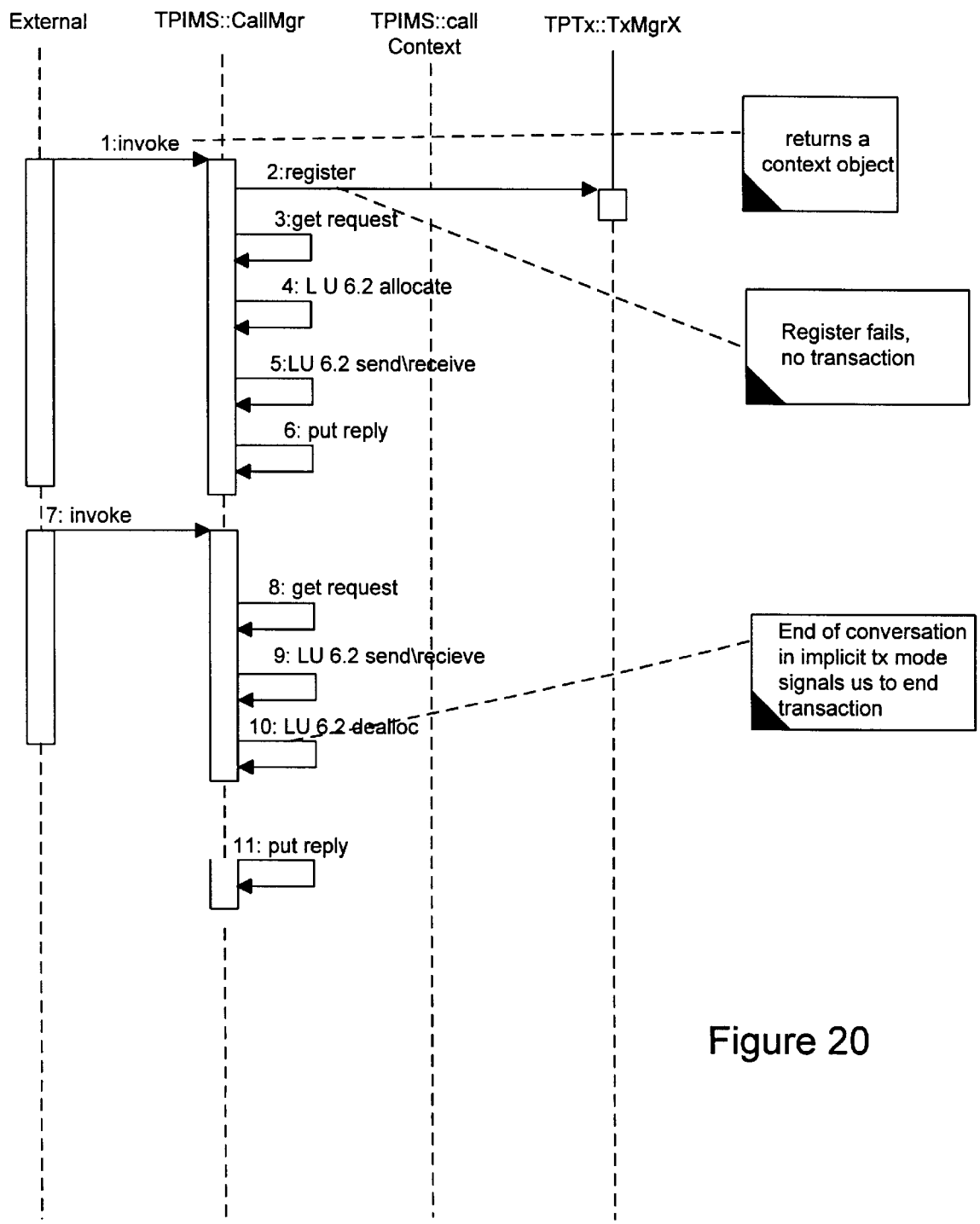

FIGS. 19 and 20 set forth some details of IMS processing in accordance with a preferred embodiment. The processing set forth in these figures corresponds very closely to the processing in FIGS. 17 and 18. The purpose of this component is to provide connectivity between the TP interoperability module and an IMS system running on another computer. Connectivity to IMS is achieved through the IMS LU 6.2 to LU 6.1 adapter which will place an IMS transaction on the IMS transaction queue. The IMS adapter allows a client LU 6.2 application (written to the basic LU 6.2 level or using the CPIC interface) to connect to an IMS system running on a server through the IMS LU 6.2 to LU 6.2 adapter.

Usage Notes

With IMS it is not easy to determine when an IMS transaction is started or ended, therefore whether a transaction is started explicitly or implicitly is irrelevant to the IMS transaction on the server side.

If there is not a current transaction, the StartTransaction property will be checked. If it is set to yes, the conversation will be ended at the end of a successful LU 6.2 send/receive (request/reply mode) or at the end of a conversation initiated by LU 6.2 allocate.

Request/response will always return a nil callContext object. Conversational always returns a callContext object, unless the conversation is ended after the LU 6.2 send/receive.

Service Parameters

The following service parameters are defined:

| Name | Description | Values |
|---|---|---|
| Partner Name | Name of CPIC side file | char [8] |
| TP Name | IMS Transaction name | char [8] |

Pathway

Figure 21:
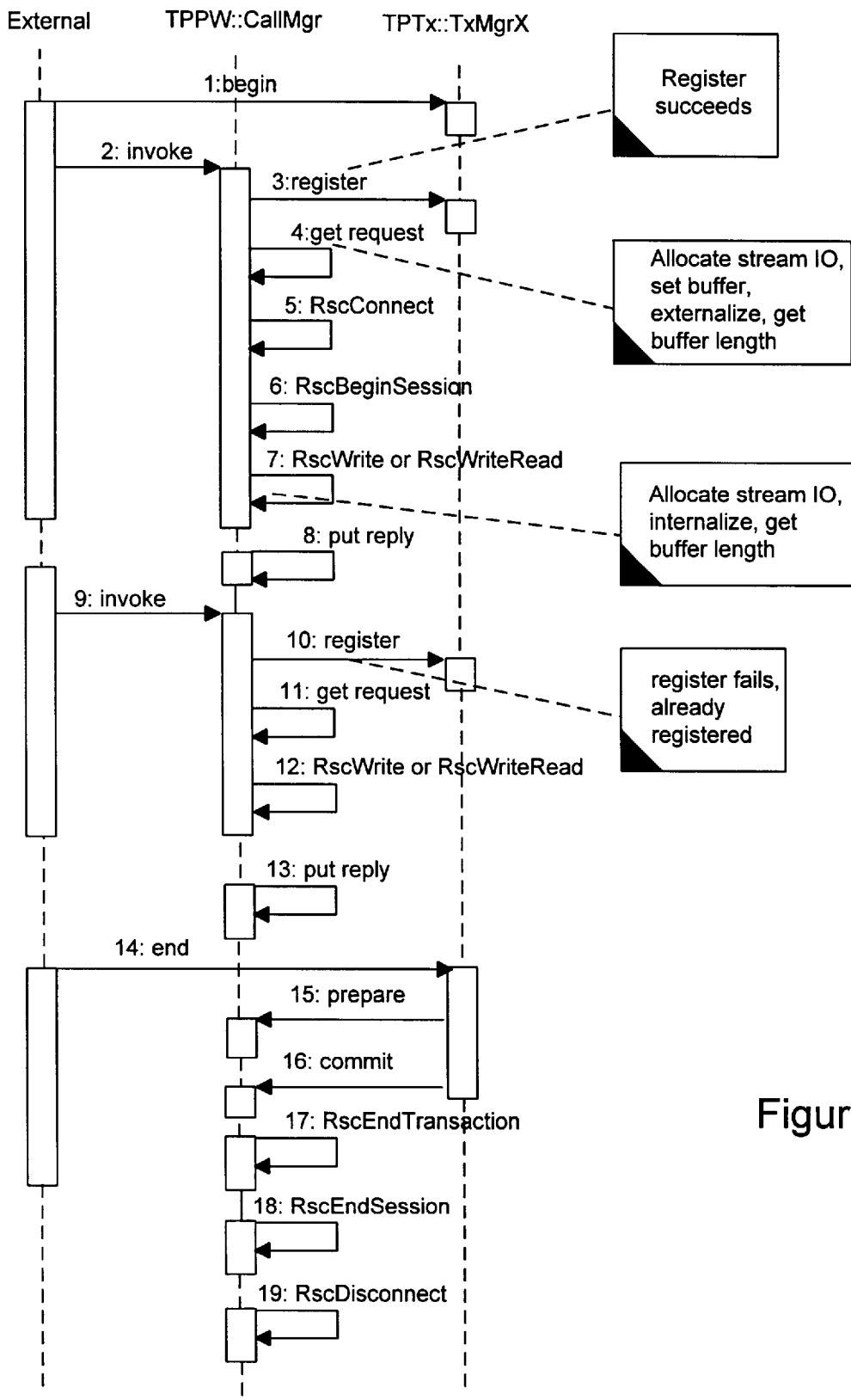
FIGS. 21 and 22 forth some details of Pathway processing in accordance with a preferred embodiment.
Figure 22:
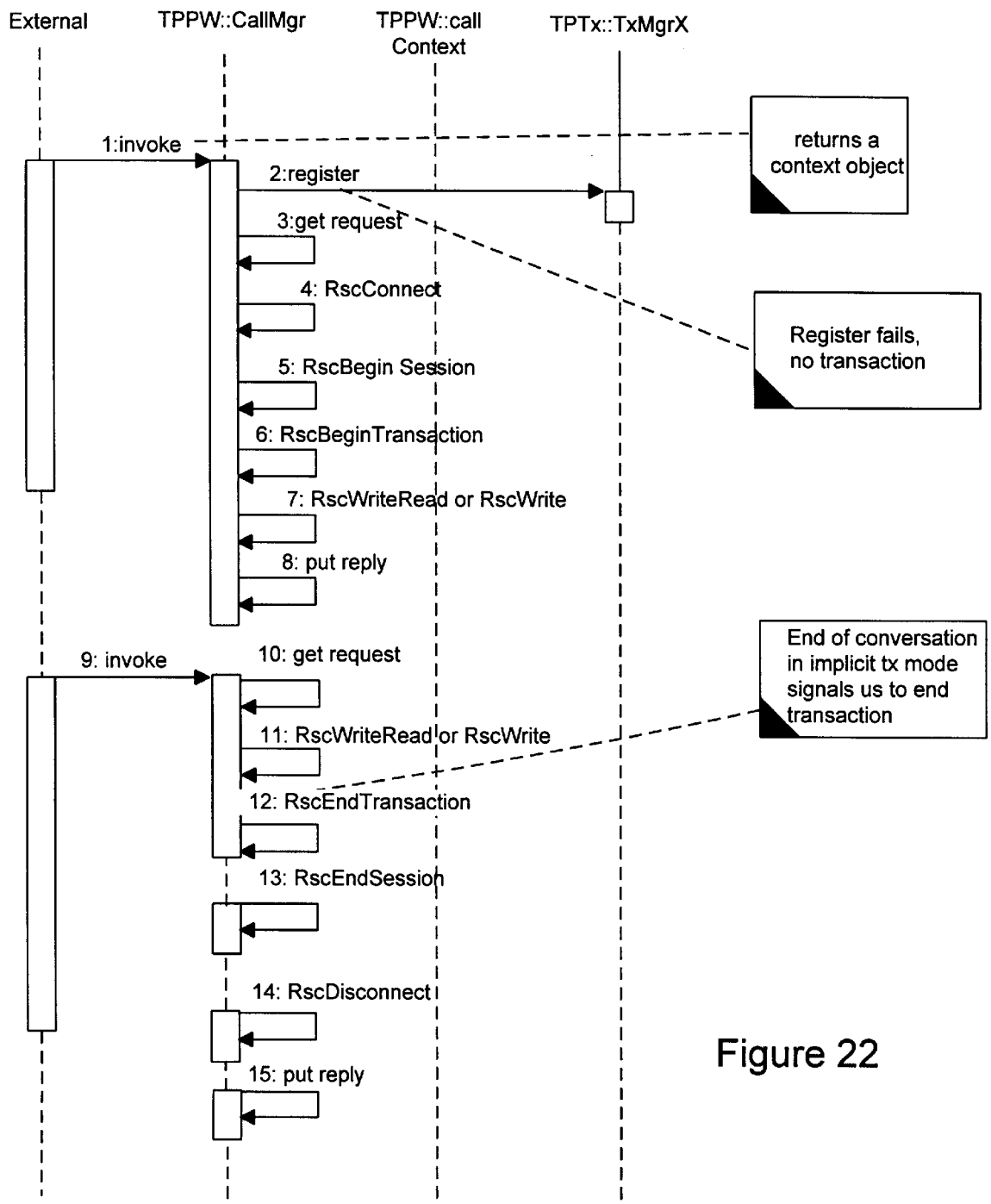

FIGS. 21 and 22 set forth details of Pathway processing in accordance with a preferred embodiment. The processing set forth in these figures corresponds very closely to the processing in FIGS. 17 and 18. The purpose of this component is to provide interoperability between the TP interoperability module and a Pathway system running on a Tandem computer. Connectivity to Pathway is achieved through the RSC service which runs on the client and server (Tandem) side. The RSC service allows a client application to connect to a Pathway system running on a server through TCP/IP.

Usage Notes

In conversational mode, to initiate a RscWrite, pass in a NULL reply object. Otherwise for a RscWriteRead a non-NULL response and reply objects are required.

If there is not a current transaction, the StartTransaction property will be checked. If it is set to yes, a transaction will be started and committed at the end of a successful RscWrite or RscWriteRead (request/reply mode) or at the end of a conversation initiated by RscBeginSession.

Request/response will always return a nil callContext object. Conversational always returns a callContext object, unless the conversation is ended on the RscEndSession.

Service Parameters

The following service parameters are defined:

| Name | Description | Values |
|---|---|---|
| Pathway Server Class Name | Name of the application Pathway server class. | Char [16] |
| RSC INI File Name | File name for initiation parameters | char [8] |
| Start Transaction | Start a transaction when there isn't a current one | Implicit, None |

Tuxedo

The Tuxedo TP interop component is a concrete implementation of several abstract classes. It supports the following features:

Request/response (tpcall) access to Tuxedo services is supported.

Conversational (tpconnect) access to Tuxedo services is supported.

The Tuxedo TP interop component will run on a machine supporting either native Tuxedo or/WS.

The four types of Tuxedo communication buffers, CARRAY, String, VIEW and FML, are supported to facilitate access to transaction demarcation verbs.

Usage Scenarios

Figure 23:
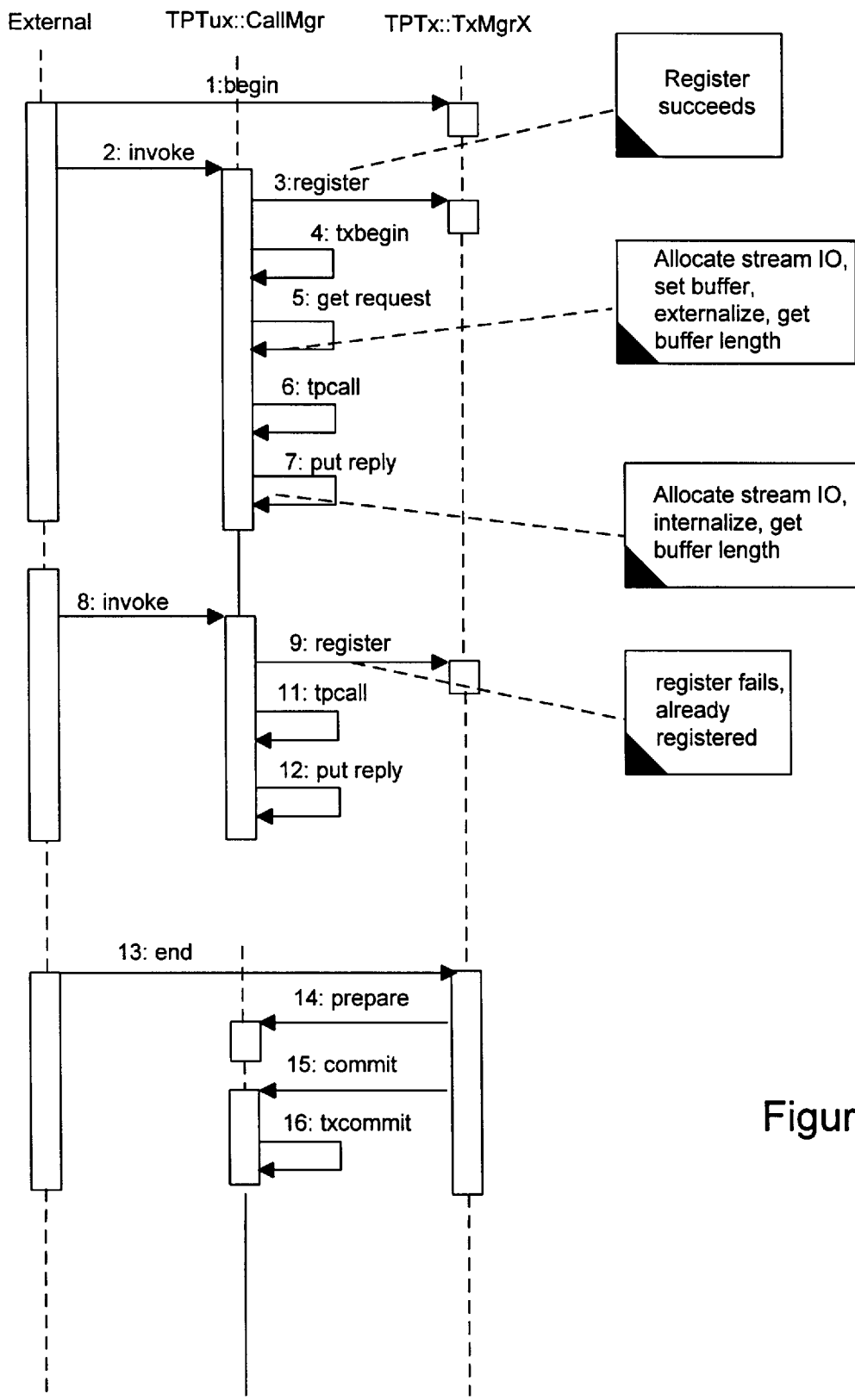
FIG. 23 illustrates a Tuxedo request/response transactions within an explicit transaction in accordance with a preferred embodiment.
Figure 24:
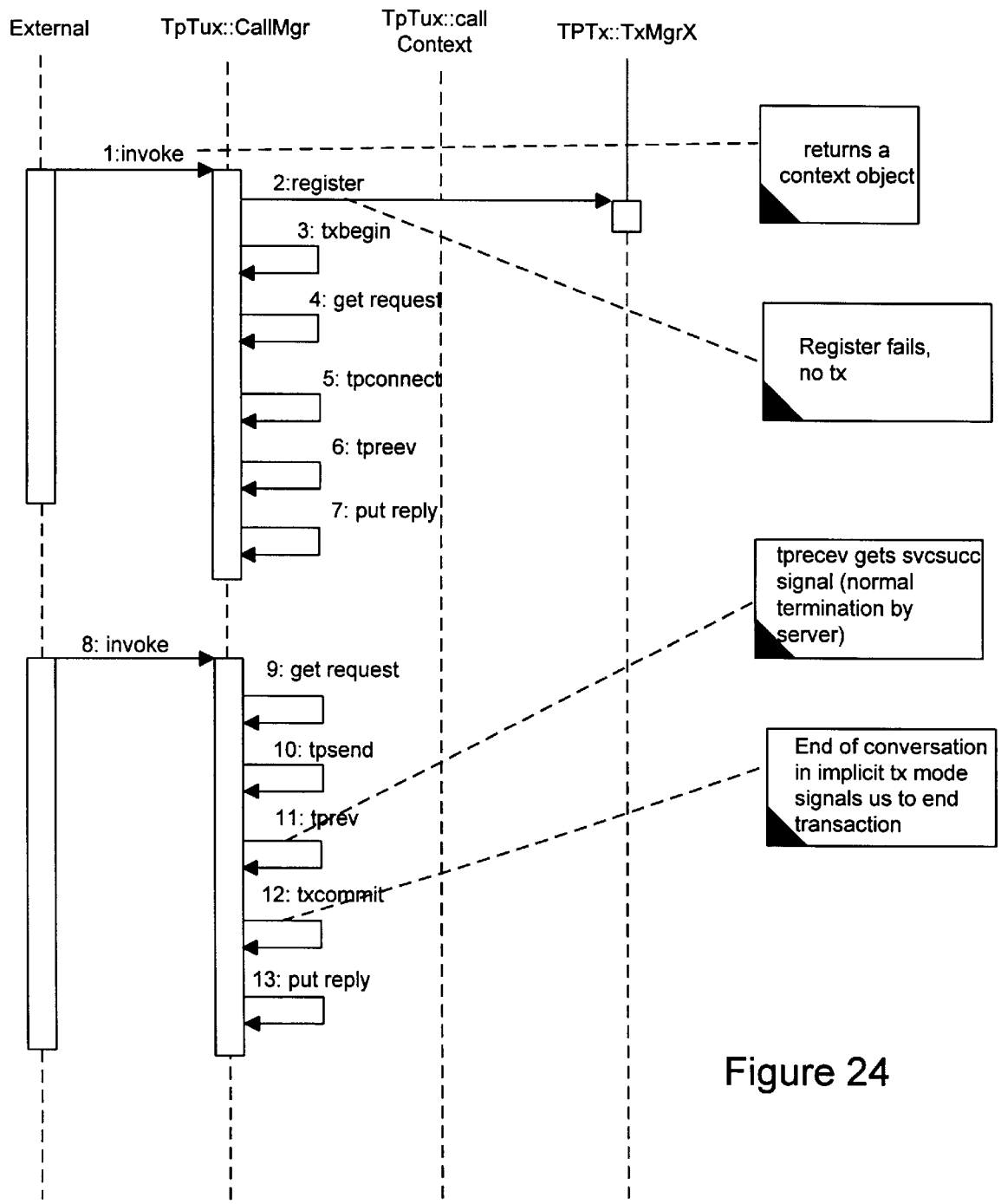
FIG. 24 illustrates a Tuxedo conversational transaction within an implicit transaction in accordance with a preferred embodiment.

FIG. 23 illustrates Tuxedo request/response transactions within an explicit transaction in accordance with a preferred embodiment. FIG. 24 illustrates a Tuxedo conversational transaction within an implicit transaction in accordance with a preferred embodiment. The processing set forth in these figures corresponds very closely to the processing in FIGS. 17 and 18.

Usage Notes

In conversational mode, to initiate a tprecv without a previous tpsend, pass in a NULL request object. To initiate a tpsend without a subsequent tprecv, pass in a NULL reply object.

If there is not a current transaction, the StartTransaction property will be checked. If it is set to yes, a transaction will be started and committed at the end of a successful tpcall or at the end of a conversation initiated by tpconnect.

Request/response will always return a nil callContext object. Conversational always returns a callContext object, unless the conversation is ended on the tpconnect.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for processing transactions between an object-oriented application and one or more transaction processors, comprising the steps of:

(a) establishing a first communication link between the object-oriented application and a transaction processor interoperability component;

(b) determining which of the one or more transaction processors will process transactions for the object-oriented application;

(c) establishing a communication link between the transaction processor interoperability component and the transaction processor that will process transactions for the object-oriented application;

(d) transmitting a transaction from the object-oriented application to the transaction processor interoperability component;

(e) formatting the transaction by the transaction processor interoperability component for the transaction processor that will process transactions for the object-oriented application, including conversion of object-oriented application information into information compatible with the transaction processor utilizing an externalization service; and (f) transmitting the formatted transaction to the transaction processor that will process transactions for the object-oriented application.

2. The method of claim 1, wherein the externalization service comprises typed ASCII to EBCDIC data conversion for object-oriented applications.

3. The method of claim 1, wherein the externalization service comprises conversion between big endian and little endian number formats for object-oriented applications.

4. The method of claim 1, wherein the externalization service comprises a typed buffer for information passing between the object-oriented application and the transaction processor.

5. The method of claim 1, wherein the externalization service includes an interface for padded strings for object-oriented applications.

6. The method of claim 1, wherein the externalization service includes support for Tuxedo typed buffers for an object-oriented application.

7. The method of claim 1, wherein the externalization service includes an interface for system data alignment for programming structures within an object-oriented application.

8. A system for processing transactions between an object-oriented application and one or more transaction processors, comprising:

(a) means for establishing a first communication link between the object-oriented application and a transaction processor interoperability component;

(b) means for determining which of the one or more transaction processors will process transactions for the object-oriented application;

(c) means for establishing a communication link between the transaction processor interoperability component and the transaction processor that will process transactions for the object-oriented applications;

(d) means for transmitting a transaction from the object-oriented application to the transaction processor interoperability component;

(e) means for formatting the transaction by the transaction processor interoperability component for the transaction processor that will process transactions for the object-oriented application, including conversion of object-oriented application information into information compatible with the transaction processor utilizing an externalization service; and (f) means for transmitting the formatted transaction to the transaction processor that will process transactions for the object-oriented application.

9. The system of claim 8, wherein the externalization service comprises typed ASCII to EBCDIC data conversion for object-oriented applications.

10. The system of claim 8, wherein the externalization service comprises conversion between big endian and little endian number formats for object-oriented applications.

11. The system of claim 8, wherein the externalization service comprises a typed buffer for information passing between the object-oriented application and the transaction processor.

12. The system of claim 8, wherein the externalization service includes an interface for padded strings for object-oriented applications.

13. The system of claim 8, wherein the externalization service includes support for Tuxedo typed buffers for an object-oriented application.

14. The system of claim 8, wherein the externalization service includes an interface for system data alignment for programming structures within an object-oriented application.

15. A computer program embodied on a computer-readable medium for processing transactions between an object-oriented application and one or more transaction processors, comprising:

(a) a code segment for establishing a first communication link between the object-oriented application and a transaction processor interoperability component;

(b) a code segment for determining which of the one or more transaction processors will process transactions for the object-oriented application;

(c) a code segment for establishing a communication link between the transaction processor interoperability component and the transaction processor that will process transactions for the object-oriented application;

(d) a code segment for transmitting a transaction from the object-oriented application to the transaction processor interoperability component;

(e) a code segment for formatting the transaction by the transaction processor interoperability component for the transaction processor that will process transactions for the object-oriented application, including conversion of object-oriented application information into information compatible with the transaction processor utilizing an externalization service; and (f) a code segment for transmitting the formatted transaction to the transaction processor that will process transactions for the object-oriented application.

16. A computer program as recited in claim 15, wherein the externalization service comprises typed ASCII to EBCDIC data conversion for object-oriented applications.

17. A computer program as recited in claim 15, wherein the externalization service comprises conversion between big endian and little endian number formats for object-oriented applications.

18. A computer program as recited in claim 15, wherein the externalization service comprises a typed buffer for information passing between the object-oriented application and the transaction processor.

19. A computer program as recited in claim 15, wherein the externalization service includes an interface for padded strings for object-oriented applications.

20. A computer program as recited in claim 15, wherein the externalization service includes support for Tuxedo typed buffers for an object-oriented application.

21. A computer program as recited in claim 15, wherein the externalization service includes an interface for system data alignment for programming structures within an object-oriented application.

* * * * *